United States Patent
Saji et al.

(10) Patent No.: US 10,512,973 B2
(45) Date of Patent: Dec. 24, 2019

(54) CUTTING TOOL REPLACEMENT MEMBER AND CUTTING TOOL BODY

(71) Applicant: TUNGALOY CORPORATION, Fukushima (JP)

(72) Inventors: Ryuichi Saji, Iwaki (JP); Yusuke Shiota, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 0 days.

(21) Appl. No.: 15/735,564

(22) PCT Filed: Jul. 26, 2016

(86) PCT No.: PCT/JP2016/071902
§ 371 (c)(1),
(2) Date: Dec. 11, 2017

(87) PCT Pub. No.: WO2017/018422
PCT Pub. Date: Feb. 2, 2017

(65) Prior Publication Data
US 2018/0169770 A1 Jun. 21, 2018

(30) Foreign Application Priority Data
Jul. 27, 2015 (JP) .................................. 2015-147307

(51) Int. Cl.
*B23B 51/00* (2006.01)
*B23B 51/04* (2006.01)
(Continued)

(52) U.S. Cl.
CPC ........ *B23B 51/042* (2013.01); *B23B 51/0054* (2013.01); *B23B 51/0493* (2013.01);
(Continued)

(58) Field of Classification Search
CPC ... B23B 51/06; B23B 51/048; B23B 51/0054; B23B 2251/56; Y10T 408/5586; Y10T 408/98
See application file for complete search history.

(56) References Cited

U.S. PATENT DOCUMENTS 4,130,371 A * 12/1978 Druxeis ................ B23B 27/141
407/114
5,209,611 A * 5/1993 Drescher ................... B23C 5/08
407/114
(Continued)

FOREIGN PATENT DOCUMENTS

DE 102010052845 A1 5/2012
EP 2862656 A1 4/2015
(Continued)

OTHER PUBLICATIONS

International Preliminary Report on Patentability and Written Opinion issued in PCT/JP2016/071902; dated Jan. 30, 2018.
(Continued)

*Primary Examiner* — Nicole N Ramos
(74) *Attorney, Agent, or Firm* — Studebaker & Brackett PC

(57) ABSTRACT

A cutting tool replacement member including: a lower surface which serves as a seating surface; an upper surface opposed to the lower surface; and a side surface connected to the upper surface and the lower surface. In a top view, the upper surface includes, in an intersection between the upper surface and the side surface, a reference side edge and an inclined side edge inclined relative to the reference side edge. The side surface includes a first side surface part connected to the reference side edge of the upper surface, and a second side surface part connected to the inclined side edge of the upper surface. At least one of the first side surface part and the second side surface part is provided with (Continued)

an overhanging part that, in a top view, protrudes outwardly with respect to the reference side edge or the inclined side edge.

11 Claims, 24 Drawing Sheets

(51) Int. Cl.
  *B23B 51/08* (2006.01)
  *B23D 77/00* (2006.01)
  *B23D 77/02* (2006.01)
(52) U.S. Cl.
  CPC ............ *B23B 51/08* (2013.01); *B23D 77/006* (2013.01); *B23D 77/02* (2013.01)

(56) References Cited

U.S. PATENT DOCUMENTS

| | | | | |
|---|---|---|---|---|
| 5,697,737 | A * | 12/1997 | Danielsson | B23B 51/0493 175/408 |
| 6,238,146 | B1 * | 5/2001 | Satran | B23B 27/1614 407/113 |
| 6,602,028 | B1 * | 8/2003 | Lindblom | B23B 51/048 175/399 |
| 6,939,091 | B2 * | 9/2005 | Wermeister | B23C 5/08 407/103 |
| 7,275,895 | B2 * | 10/2007 | Heinloth | B23C 5/08 407/113 |
| 7,448,832 | B2 * | 11/2008 | Annanolli | B23B 51/048 407/117 |
| 2008/0240871 | A1 * | 10/2008 | Bar | B23C 5/08 407/35 |
| 2011/0008116 | A1 | 1/2011 | Nomura | |
| 2012/0134759 | A1 | 5/2012 | Manfred et al. | |
| 2013/0136551 | A1 * | 5/2013 | Nisikawa | B23B 51/048 408/83 |

FOREIGN PATENT DOCUMENTS

| | | |
|---|---|---|
| JP | S58-165910 A | 10/1983 |
| JP | 2000-071113 A | 3/2000 |
| JP | 2009-220210 A | 10/2009 |
| JP | 2010-528882 A | 8/2010 |
| JP | 2013-509308 A | 3/2013 |
| JP | 2014030854 A | 2/2014 |
| WO | 9608332 A1 | 3/1996 |
| WO | 2008149371 A1 | 12/2008 |
| WO | 2011/126231 A2 | 10/2011 |
| WO | 2014104432 A1 | 7/2014 |

OTHER PUBLICATIONS

The extended European search report issued by the European Patent Office dated May 30, 2018, which corresponds to European Patent Application No. 16830527.4-1019 and is related to U.S. Appl. No. 15/735,564.

International Search Report issued in PCT/JP2016/071902; dated Oct. 11, 2016.

* cited by examiner

CUTTING TOOL REPLACEMENT MEMBER AND CUTTING TOOL BODY

TECHNICAL FIELD

The present invention relates to a cutting tool replacement member used for a cutting tool and also relates to a cutting tool body comprising the cutting tool replacement member.

BACKGROUND ART

A conventional cutting tool involves the mounting of a replacement member to be replaced as the need arises, and, in particular, a cutting tool for deep-hole machining may involve the mounting of a guide pad on an outer periphery of a body of the cutting tool in order to increase the straightness of the cutting tool so as to perform high-precision machining. The guide pad comes into contact with an inner wall surface of a machined hole during cutting, so that the cutting tool can travel straight along the hole. Examples of a method of fixing a guide pad include the brazing technique disclosed in Patent Document 1 and also include a method of fixing with screws.

CITATION LIST

Patent Documents

Patent Document 1: JP2009-220210 A

SUMMARY

Technical Problem

A guide pad wears due to friction with the wall of a hole and will, in time, not exert its sufficient effect. In the case of the form of complete fixation of a guide pad to a body via brazing, as in Patent Document 1, it is difficult to remove a worn-out guide pad and replace it with a new one. That is, when attempting to replace the brazed guide pad, the brazing material needs to be heated again so as to be melted, and at this time, heat propagates through the body as well, so that the body is prone to becoming deformed. Meanwhile, it is uneconomical to replace not only the guide pad which has undergone the progress of wear but also a main part of the body which has suffered a small amount of damage. Further, in the case of the form of fixation of a guide pad with screws, threaded holes need to be formed in both the guide pad and the main part of the body, leading to the problem of reduced strengths of the guide pad and the main part of the body.

An object of the present invention is to solve at least one of the above-described problems. Another object of the present invention is to provide a cutting tool replacement member which is removable and which does not reduce the strength of a body and a cutting tool body comprising such cutting tool replacement member.

Solution to Problem

The first invention provides a cutting tool replacement member comprising: a lower surface which serves as a seating surface; an upper surface which is opposed to the lower surface; and a side surface which is connected to the upper surface and the lower surface, wherein: when seen from a top view, the upper surface comprises, in an intersection between the upper surface and the side surface, a reference side edge and an inclined side edge which is inclined relative to the reference side edge; the side surface includes a first side surface part which is connected to the reference side edge of the upper surface, and a second side surface part which is connected to the inclined side edge of the upper surface; and at least one of the first side surface part and the second side surface part is provided with an overhanging part which is, when seen from a top view, protruding outward with respect to the reference side edge or the inclined side edge.

In the cutting tool replacement member of the present invention, it is preferable that the overhanging part includes an inclined surface which is inclined outward, heading from the upper surface toward the lower surface.

In the cutting tool replacement member of the present invention, it is preferable that the upper surface is convex in a cross section substantially perpendicular to the lower surface.

The present invention provides a cutting tool body comprising: the cutting tool replacement member of the present invention; and a housing part for mounting the cutting tool replacement member, wherein: the housing part comprises, a mounting surface which is configured such that the lower surface of the cutting tool replacement member is slidable, a first wall part which extends so as to rise from the mounting surface and with which the first side surface part of the cutting tool replacement member is capable of coming into contact, a second wall part which extends so as to rise from the mounting surface and with which the second side surface part of the cutting tool replacement member is capable of coming into contact, and an opening which is partially defined by the mounting surface, the first wall part and the second wall part, and wherein: a spacing between the first wall part and the second wall part gradually becomes narrower, heading away from the opening as viewed from a direction facing the mounting surface such that a fastening force is exerted on the cutting tool replacement member; and at least one of the first wall part and the second wall part includes an engagement part which is engaged with the overhanging part of at least one of the first side surface part and the second side surface part of the cutting tool replacement member.

In the cutting tool body of the present invention, it is preferable that: the first wall part is provided with a flank part for dividing a contact portion with the first side surface part into two areas; and when seen from a top view, a contact portion between the second wall part and the second side surface part is included in a virtual area defined by two virtual planes which respectively pass through two ends of the flank part.

Advantageous Effects of Invention

The present invention can provide a replaceable cutting tool replacement member which is removable and does not reduce the strength of a body and a cutting tool body comprising such cutting tool replacement member. The cutting tool replacement member of the present invention is removable from the cutting tool body, and thus, when the cutting tool replacement member needs to be replaced due to, for example, the progress of wear, it can be easily replaced with a new one. Therefore, as opposed to the prior art, the cutting tool body does not need to be replaced in its entirety, which is economical. Further, when fixing the cutting tool replacement member to the cutting tool body, a fastening tool such as a screw is not required, and the cutting tool replacement member can therefore be replaced in an extremely simple manner. Moreover, there is no need to machine the cutting tool replacement member and the cutting tool body of the present invention so as to be provided with mounting holes, etc., and thus, the strengths thereof will not be reduced.

DESCRIPTION OF EMBODIMENTS

Figure 1:
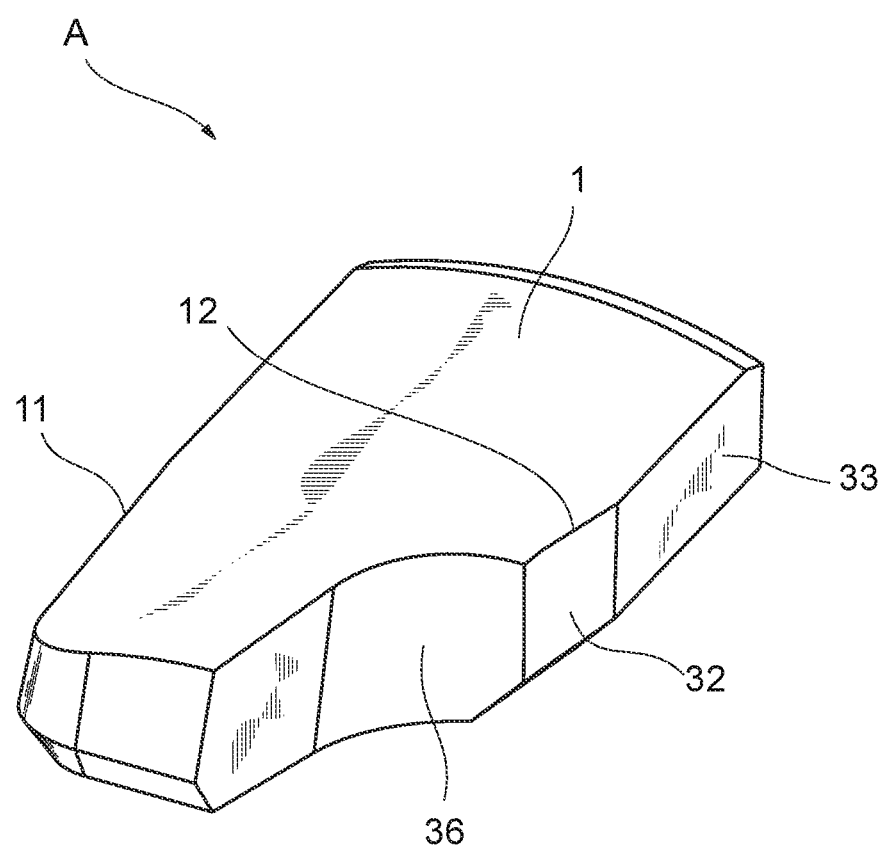
FIG. 1 is a perspective view of a guide pad according to an embodiment of the present invention.
Figure 2:
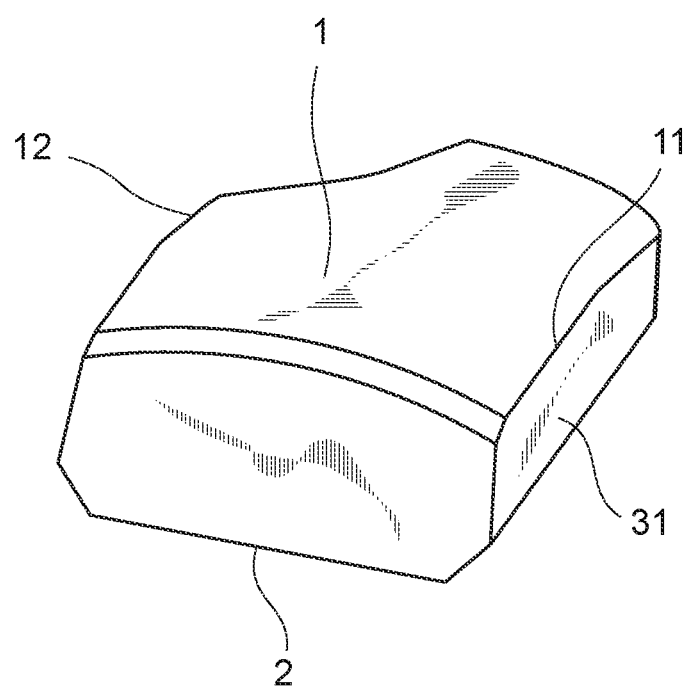
FIG. 2 is a perspective view of the guide pad of FIG. 1, as viewed from another angle.

The present invention will hereinafter be described with reference to the drawings representing an embodiment of the present invention. For the purposes of description, the terms "upper," "lower," etc., which indicate the relative positional relationships between objects or in one object may be used, but such terms merely describe the positional relationships in the drawings for the facilitation of understanding the description and do not define the absolute positional relationships. For example, even if the description "object A is located above object B" is used, such description is merely reflected in the specific drawings and is not intended to indicate that object A is consistently and absolutely arranged above object B in the invention.

FIGS. 1 to 4 each show a guide pad A serving as an embodiment of the present invention. The guide pad A comprises two opposing end surfaces 1, 2 and a side surface 3 extending therebetween. The two opposing end surfaces 1, 2 are comprised of a convex end surface 1 (hereinafter referred to as an upper surface 1) and a flat end surface 2 (hereinafter referred to as a lower surface 2). The side surface 3 connects the upper surface 1 and the lower surface 2.

Figure 3:
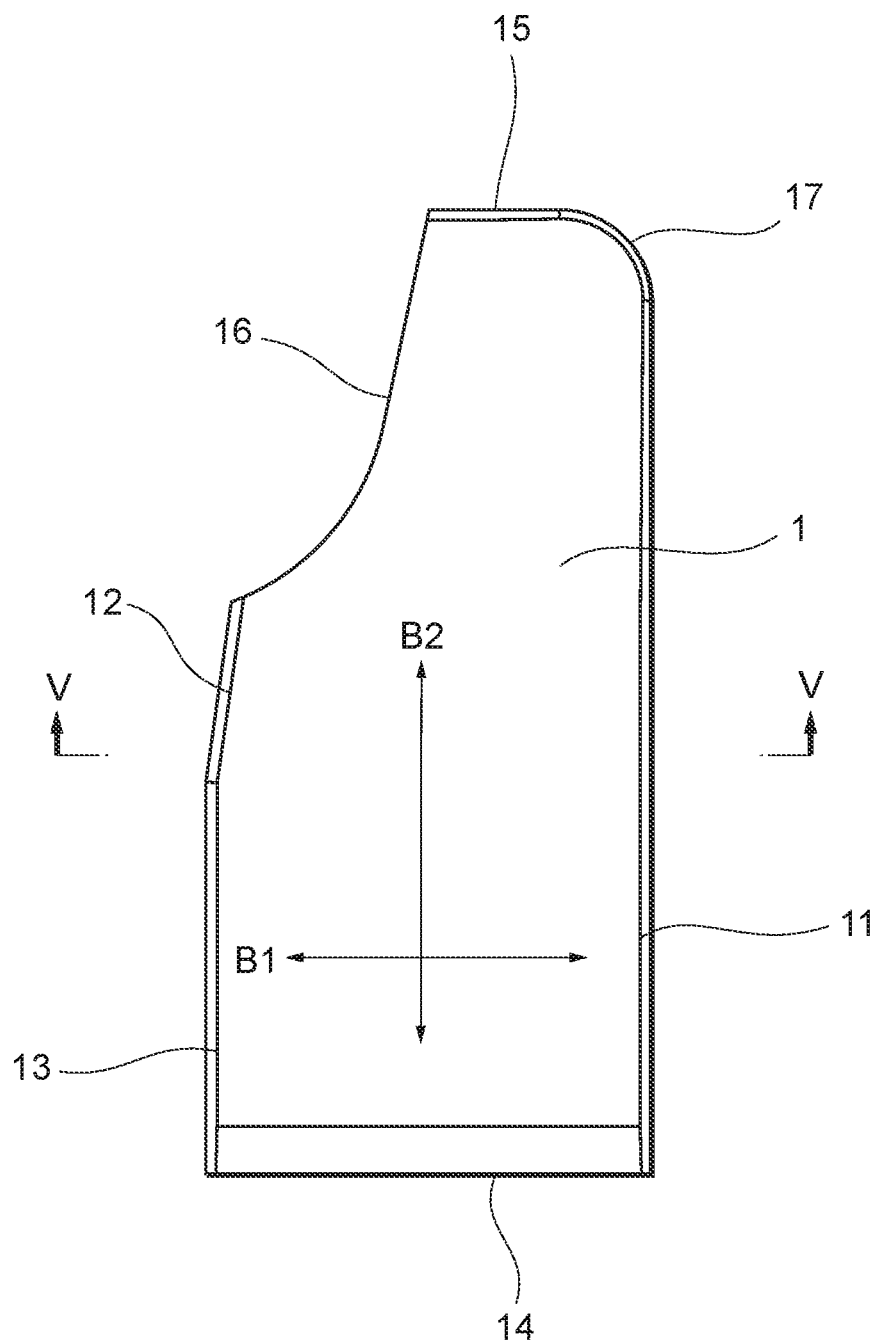
FIG. 3 is a front view of the guide pad of FIG. 1.

The upper surface 1 has a shape which is closely analogous to a pentagon, as is apparent from the front view of FIG. 3 (a top view, i.e., a view of the guide pad A as seen from a side facing the upper surface). An intersection, i.e., a side edge between the upper surface 1 and the side surface 3 includes: a first side edge 11 being the longest side edge; a second side edge 12 which is located so as to be opposed to the first side edge 11 and which is inclined relative to the first side edge 11; a third side edge 13 which is substantially parallel to the first side edge 11 and which is connected to the second side edge 12; and a fourth side edge 14 and a fifth side edge 15 which extend in a perpendicular manner, in FIG. 3, with respect to the first side edge 11 and the third side edge 13 and which are substantially parallel to each other. It should be noted that the upper surface 1 includes, in addition to the first side edge 11 through the fifth side edge 15, a sixth side edge 16 in a concave shape. The sixth side edge 16 leads to the second side edge 12 and the fifth side edge 15. Further, a seventh side edge 17 in a convex shape which has a predetermined curvature radius is provided between the first side edge 11 and the fifth side edge 15 in FIG. 3. The side surface 3 comprises seven side surface parts which correspond, respectively, to the first side edge 11 through the seventh side edge 17. The seven side surface parts are each connected to the upper and lower surfaces 1, 2 and are placed in a substantially consecutive manner in a circumferential direction. It should be noted that the first side edge 11 through the seventh side edge 17 are connected, respectively, to the corresponding first through seventh side surface parts.

As is apparent from the description below, the guide pad A is arranged on the body such that the fourth side edge 14 is located on a leading end side of the body and such that the fifth side edge 15 is located on a base end side of the body. Based on such positional relationships, for the facilitation of understanding the description below, in FIG. 3, the direction between the first side edge 11 and the third side edge 13 (in particular, the direction parallel to the fourth side edge 14 in FIG. 3) is defined as a width direction B1, and the direction between the fourth side edge 14 and the fifth side edge 15 is defined as a longitudinal direction B2.

The upper surface 1 has a convex shape in which a center portion thereof in the width direction B1 is bowed with respect to end portions thereof. To put it another way, the upper surface 1 has an arch shape as viewed in a cross-section perpendicular to the longitudinal direction B2. Such arch shape is formed so as to have a single curvature radius.

In the guide pad A, when defining a line located at the mid-point between the first side edge 11 and the third side edge 13 so as to extend parallel to such edges, as in FIG. 3, the center of the above curvature radius is positioned on a virtual plane obtained by extending the above line so as to be orthogonal to the plane of the page. However, such configuration does not exclude the feature in which the center of the curvature radius is positioned so as to deviate from the virtual plane. It should be noted that the curvature radius of the upper surface 1 is preferably equal to or slightly greater than the curvature radius of the cylindrical body on which the guide pad A is mounted (a radius in a cross-section orthogonal to an axis of the body) from the viewpoint of increasing a contact area with the wall of a machined hole and thereby improving the straightness of the tool.

As described above, the upper surface 1 comprises: the first side edge 11 and the third side edge 13 which are substantially parallel to each other; and the second side edge 12 which is inclined relative to the third side edge 13 and leads thereto. Further, in FIG. 3, the second side edge 12 is inclined so as to approach the first side edge 11, heading toward a connecting part of the second side edge 12 with the sixth side edge 16. Therefore, the spacing between the first side edge 11 and the second side edge 12 gradually becomes narrower, heading away from the fourth side edge 14 toward the fifth side edge 15. It should particularly be noted that the first side edge 11 and the second side edge 12 serve as important configurations in the guide pad A. As needed, the first side edge 11 is referred to as a reference side edge, and the second side edge 12 is referred to as an inclined side edge.

Figure 4:
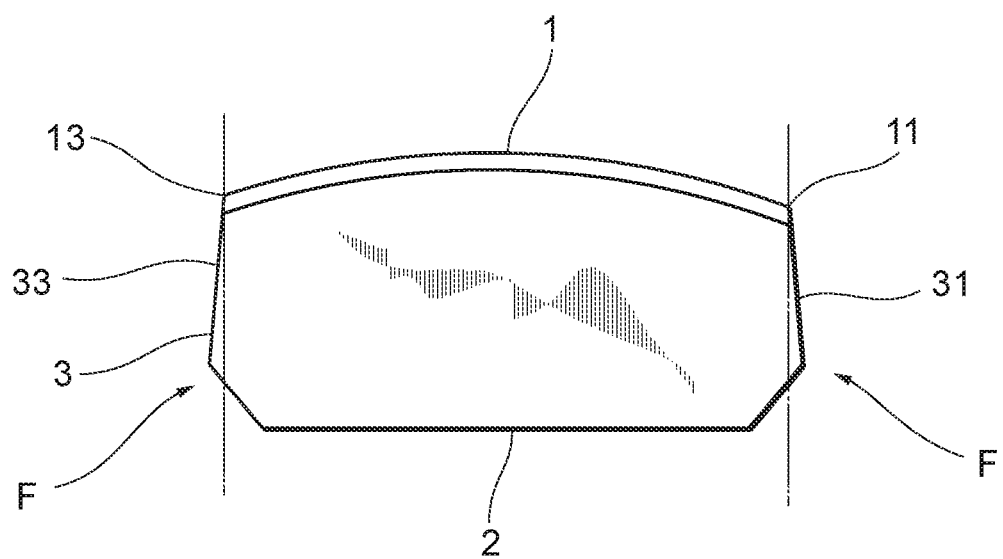
FIG. 4 is a bottom view of the guide pad of FIG. 1.
Figure 5:
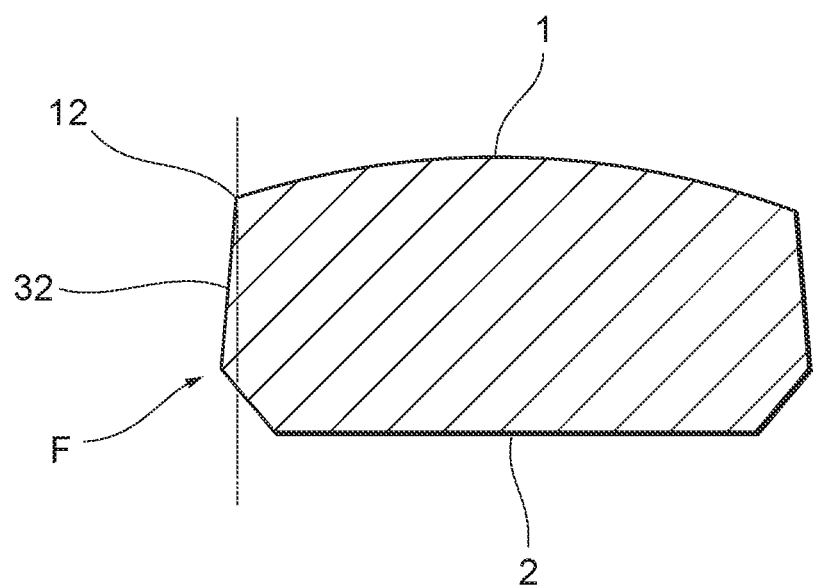
FIG. 5 is a cross-sectional view taken along a V-V line of FIG. 3.
Figure 6:
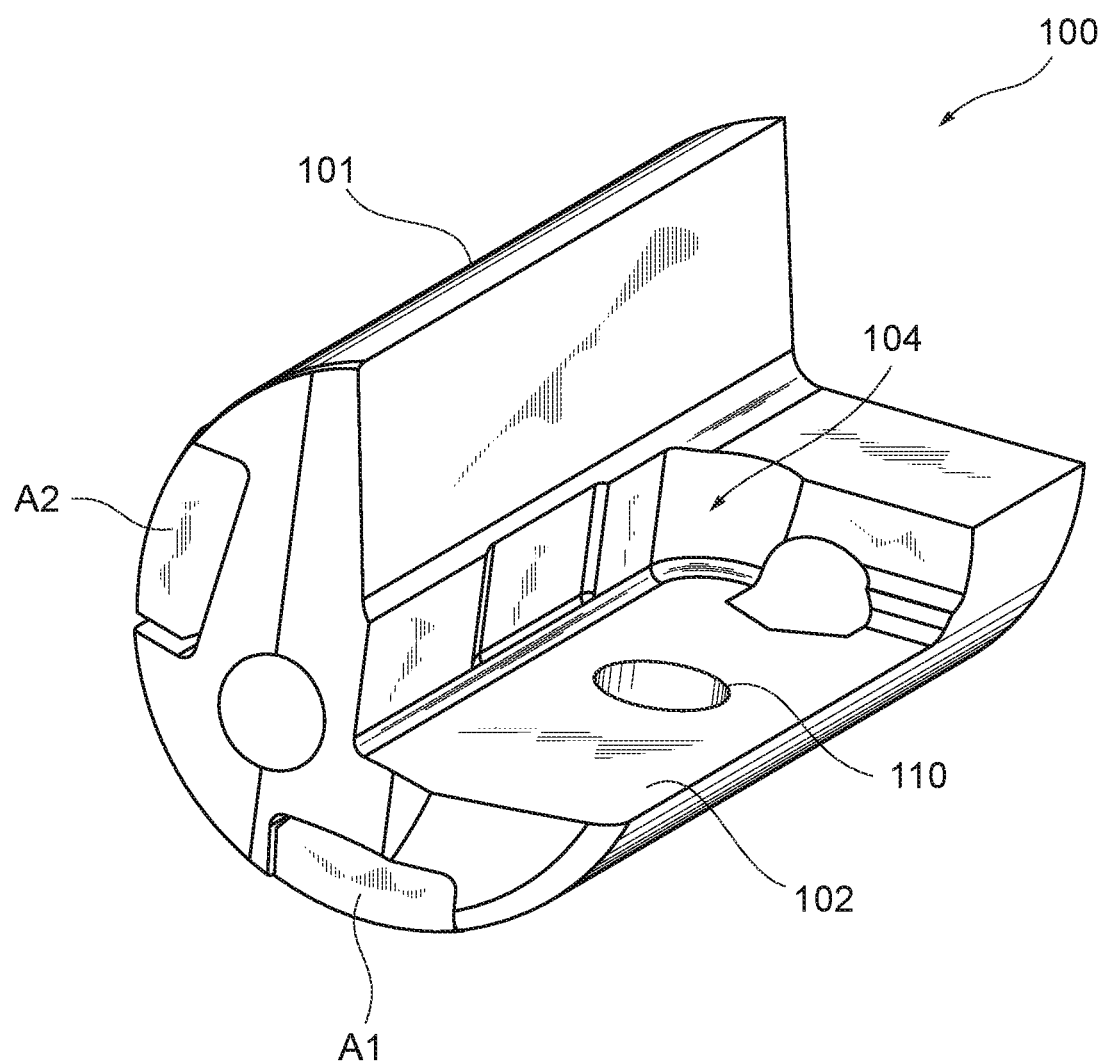
FIG. 6 is a perspective view of a cutting tool body according to an embodiment of the present invention.
Figure 7:
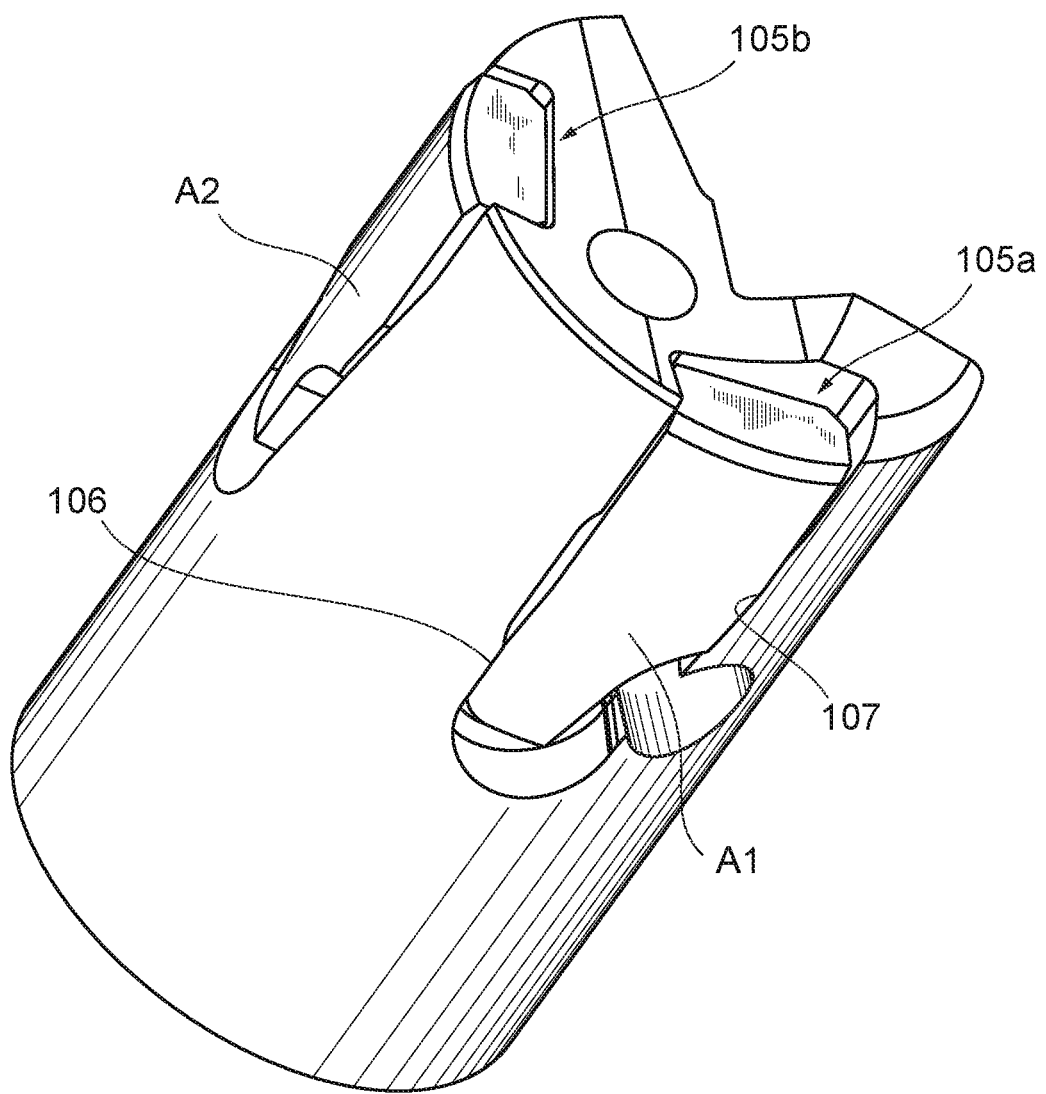
FIG. 7 is a perspective view of the cutting tool body of FIG. 5, as viewed from another angle.

As shown in FIGS. 4 and 5, in the side surface 3, a first side surface part 31 which is connected to the first side edge 11 of the upper surface 1, a second side surface part 32 which is connected to the second side edge 12 thereof and a third side surface part 33 which is connected to the third side edge 13 thereof are inclined outward, heading from the upper surface 1 toward the lower surface 2. That is, the first through third side surface parts 31 to 33 each have a so-called dovetail shape. The portions which are overhanging outward respectively from the first side surface part 31 (along the reference side edge) and the second side surface part 32 (along the inclined side edge) when seen from a top view, i.e., the portions respectively indicated by arrows F in FIGS. 4 and 5, prevent the guide pad A from being disconnected in a radial direction of the body when the guide pad A is mounted on the cutting tool body. It should be noted that a sixth side surface part 36 which extends along the sixth side edge 16 in a concave shape is connected, on the fifth side edge side of the guide pad A, to the second side surface part 32, and is formed further inward of the guide pad A than an extension plane of the second side surface part 32.

Next, a cutting tool body according to an embodiment of the present invention will be described. FIGS. 6 to 9 each show only a leading end (a leading-end-side main part) of a cutting tool body 101 for the machining of holes in the present embodiment. It should be noted that the body 101 has an axis extending from a leading end thereof to a base end thereof. A cutting tool in which a cutting insert with a cutting edge is mounted on the body 101 is used by being rotated, relative to a workpiece, with the axis serving as a rotational axis.

The cutting tool body 101 having a cylindrical shape comprises two guide pads A1, A2. These guide pads A1, A2 are mounted on an outer peripheral surface of the cutting tool body 101 so as to be apart from each other in the circumferential direction. Further, a cutting insert is removably mounted on the body 101 provided with the two guide pads A1, A2. One insert mounting part 104 is formed in the leading end of the cutting tool body 101. In other words, the body 101 is intended for a cutting tool having one cutting edge (a single edge). The insert mounting part 104 is a recessed part of a shape generally corresponding to a contour shape of the cutting insert (not shown), and the cutting insert (not shown) mounted in the recessed part is fixed by a screw inserted through a through hole formed in the cutting insert. The screw is screwed into a threaded hole 110 formed in a mounting surface 102 of the insert mounting part 104. It should be noted that a chip discharge groove is formed forward, in a tool rotating direction, with respect to the insert mounting part 104, such chip discharge groove extending substantially parallel to the axis of the body 101. Therefore, the body 101 has a substantially three quarter circular shape in a cross section taken along a virtual plane perpendicular to the axis.

The body 101 on which the cutting insert is removably mounted in this way comprises the two guide pads A1, A2, as described above. The guide pad A1 and the guide pad A2 are the same as each other and each correspond to the above-described guide pad A. Therefore, the guide pad A1 and the guide pad A2 differ only in terms of the locations where they are mounted in the cutting tool body 101.

With reference to the mounting surface 102 of the insert mounting part 104, the guide pad A1 and the guide pad A2 are arranged on an outer peripheral surface which extends backward, in the tool rotating direction, with respect to the mounting surface 102 of the insert mounting part 104 and which also extends forward, in the tool rotating direction, with respect to the chip discharge groove, so as to be apart from each other in the circumferential direction. With reference to the mounting surface 102 of the insert mounting part 104, the guide pad A1 is arranged backward in the tool rotating direction and closer to the mounting surface 102 than the guide pad A2.

Figure 8:
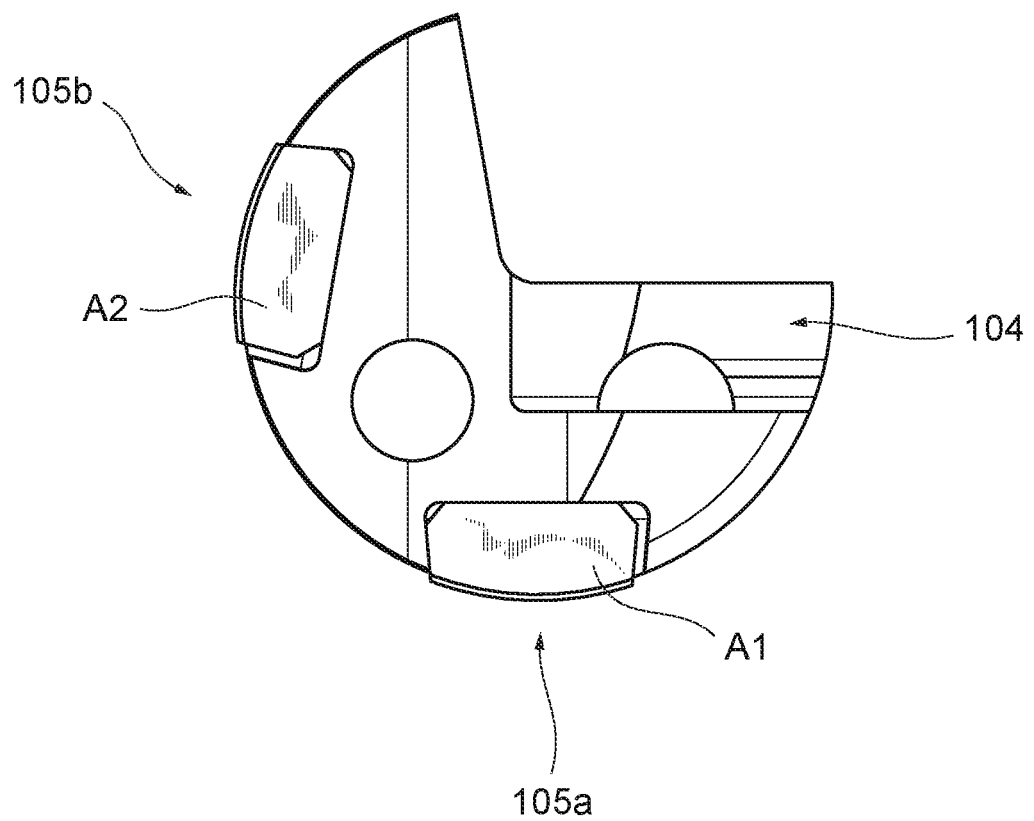
FIG. 8 is a view of the cutting tool body of FIG. 5, as viewed from its leading end side.

Guide pad housing parts 105a, 105b for mounting the guide pads A1, A2 are formed in an outer circumferential surface of the cutting tool body 101. The guide pad housing part 105a on which the guide pad A1 is mounted and the guide pad housing part 105b on which the guide pad A2 is mounted have a positional relationship corresponding to the above positional relationship between the guide pad A1 and the guide pad A2. It should be noted that, as shown in FIG. 8, the guide pad housing part 105a is opened, on a base end side thereof, with the threshold hole 110 of the insert mounting part 104. The guide pad A1 (guide pad A) is provided with the sixth side surface part 36 in a recessed shape which leads to the sixth side edge 16 in a concave shape, as described above, such that the guide pad A1 is not located on an extension of the threaded hole 110. Therefore, with regard to a body 101 in which guide pad housing parts 105a, 105b and a threaded hole 110 do not interfere with each other, it may be possible to employ guide pads which each do not comprise a sixth side surface part in a recessed shape.

It should be noted that, as can be understood from the point that the two guide pads A1, A2 are the same as each other, the two guide pad housing parts 105a, 105b also have the same configuration (in particular, the same size and the same shape) except for the feature of the interference of the threaded hole 110. Therefore, detailed description will only be made regarding the guide pad A1 and the guide pad housing part 105a on which the guide pad A1 is mounted.

Figure 10:
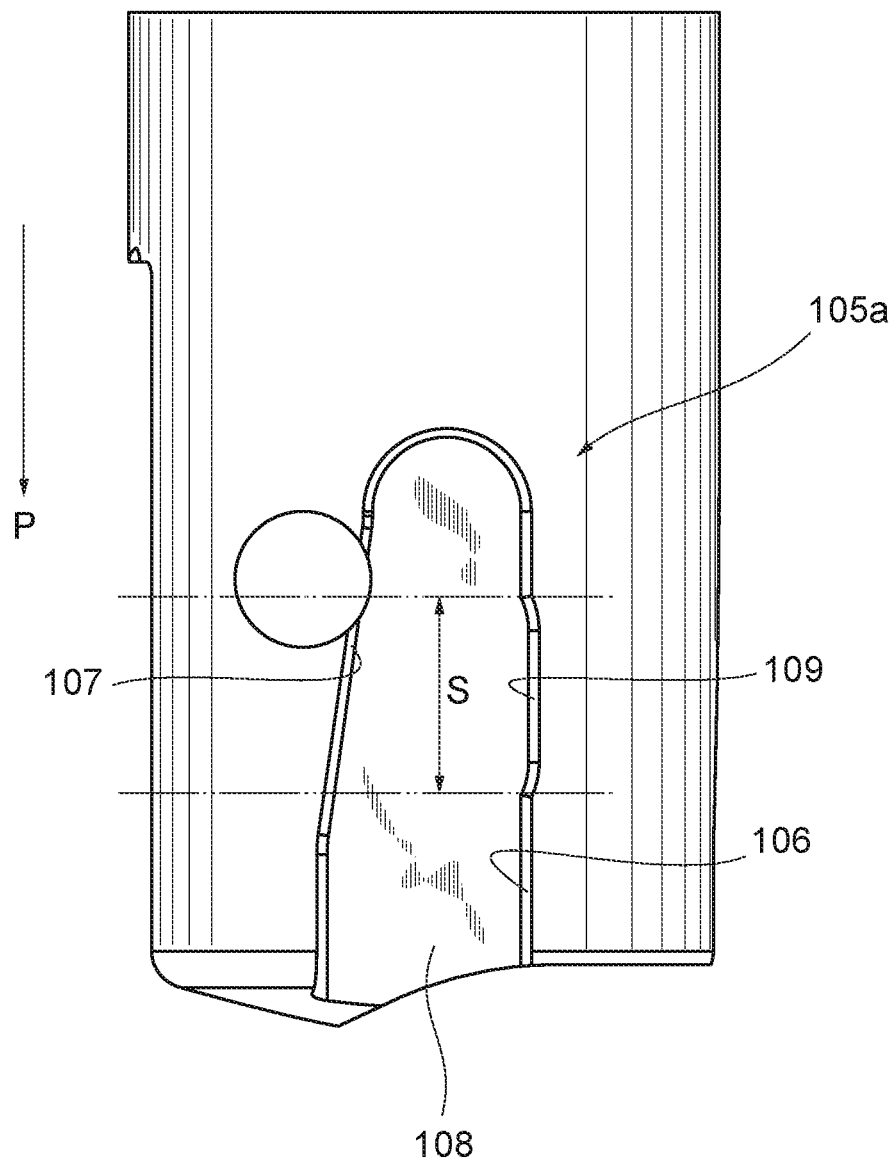
FIG. 10 is a view of the cutting tool body of FIG. 5, as viewed from a direction facing a mounting surface of a guide pad housing part.

The guide pad housing part 105*a* is shown in FIG. 10. FIG. 10 shows a state in which the guide pad A1 has been removed from the body 101.

The guide pad housing part 105*a* is opened in a leading end surface of the body 101 and is also opened in the outer circumferential surface of the body 101. The guide pad housing part 105*a* comprises a mounting surface 108 and standing walls 106,107 formed on both sides of the mounting surface 108. For the purposes of description, the standing wall 106 is referred to as a first wall part 106, and the standing wall 107 is referred to as a second wall part 107. It should be noted that, in the single guide pad housing part 105*a*, the first wall part 106 is located further backward in the tool rotating direction than the second wall part 107 with reference to the mounting surface 108 of the insert mounting part 104. It should also be noted, however, that the first wall part 106 is formed so as to extend substantially parallel to the axis of the body 101.

Figure 11:
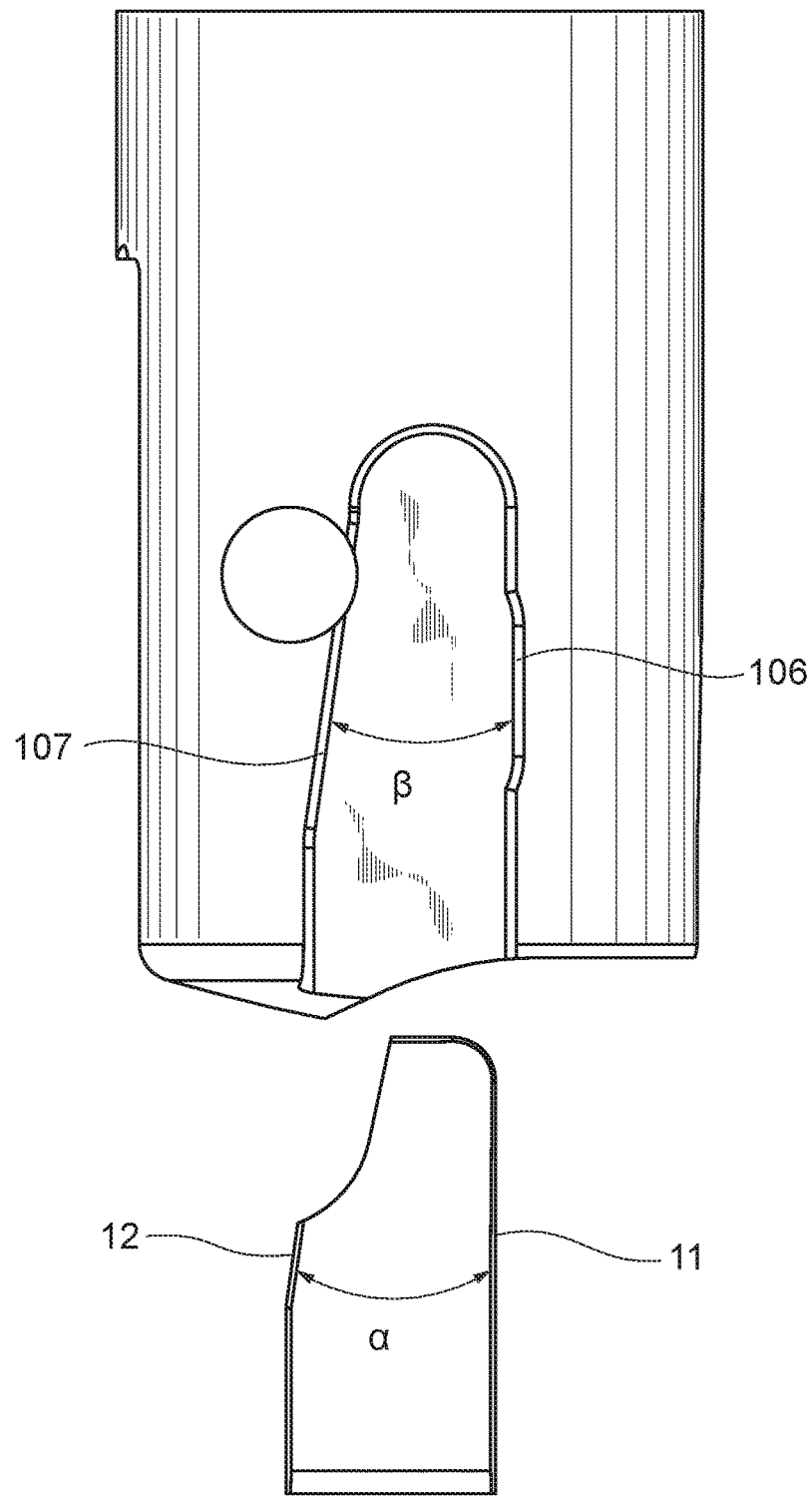
FIG. 11 is a schematic view which compares an opening angle between side edges of the guide pad and an opening angle between wall surfaces of the guide pad housing part.

The wall parts 106, 107 are configured such that the first wall part 106 comes into contact with the first side surface part 31 of the guide pad A1 and such that the second wall part 107 comes into contact with the second side surface part 32 of the guide pad A1. The first wall part 106 and the second wall part 107 are not perpendicular to the mounting surface 108 of the guide pad housing part 105*a* and are instead inclined inward to some degree (i.e., gradually becoming overhanging above the mounting surface as they head away from the mounting surface 108). That is, the angle formed by the mounting surface 108 and the first wall part 106 and the angle formed by the mounting surface 108 and the second wall part 107 each form an acute angle. To put it another way, a space which is defined by the first wall part 106, the second wall part 107 and the mounting surface 108 forms a so-called dovetail groove shape (dovetail shape). As viewed from a direction facing the mounting surface 108 (i.e., in FIGS. 9 and 10), an edge at an upper end of the second wall part 107 (an intersection between the second wall part 107 and the outer peripheral surface of the body 101) is inclined relative to an edge at an upper end of the first wall part 106. Therefore, the spacing between the two edges becomes narrower, heading toward the base end of the cutting tool body 101. More specifically, the degree of narrowing of the spacing between the edge at the upper end of the first wall part 106 and the edge at the upper end of the second wall part 107 is smaller than the degree of narrowing of the spacing between the first side edge 11 and the second side edge 12 in the top view of the guide pad of FIG. 3. In other words, as shown in FIG. 11, an angle β formed by the edge of the first wall part 106 and the edge of the second wall part 107 is slightly smaller than an angle α formed by the first side edge 11 and the second side edge 12 in the top view of the guide pad. With such shape, as described below, a fastening force is generated between the guide pad housing part 105*a* and the guide pad A1 by pushing the guide pad A1 into the guide pad housing part 105*a* from the leading end side of the body 101 in the direction of the axis, and the frictional force generated by such fastening force fixes the guide pad A1 in the direction of the rotational axis of the body.

Further, a flank part 109 is formed in the first wall part 106. The flank part 109 is formed so as to extend from the upper end of the first wall part 106 to a lower end thereof (i.e., the mounting surface 108), and the flank part 109 does not come into contact with the guide pad A1. Therefore, a contact part between the guide pad A1 and the first wall part 106 is divided into a leading end side area and a base end side area with the flank part 109 sandwiched therebetween.

Further, the second wall part 107 is formed such that a contact part between the second wall part 107 and the second side surface part 32 fits inside an area S. In other words, as is apparent from FIG. 9, when the second wall part 107 is virtually slid toward the first wall part 106 in the circumferential direction, the second wall part 107 passes through the flank part 109 only of the first wall part 106 in an axial direction. It should be noted that, as viewed from the direction facing the mounting surface 108 (i.e., in FIGS. 9 and 10), the second wall part 107 may be formed in a size which is to be fit inside a virtual area S defined by a width (axial length) of the flank part 109 formed in the first wall part 106.

As described below, balanced three-point mounting of a guide pad is enabled by forming the first wall part 106 and the second wall part 107, leading to increased fixing property of the guide pad A1.

When the guide pad A1 is mounted on the guide pad housing part 105*a* formed as described above, the guide pad A1 is inserted, through an entry port of the guide pad housing part 105*a* (an opening of the guide pad housing part 105*a* which is opened in the leading end surface of the body 101), so as to slide over the mounting surface 108. As a result, the first side surface part 31 and the second side surface part 32 of the guide pad A1 are pushed toward the mounting surface by the first wall part 106 and the second wall part 107, respectively, and the guide pad A1 is less likely to be disconnected, i.e., firmly held, in a direction of a normal of the mounting surface 108, i.e., a radial direction of the cutting tool body 101.

Next, the effects of the guide pad of the present embodiment will be described. It should be noted that description will be made below regarding the guide pad A1 and the guide pad housing part 105*a* on which the guide pad A1 is mounted, and the same applies to the guide pad A2 and the guide pad housing part 105*b*.

When the guide pad A1 is inserted into the guide pad housing part 105*a* from a leading end side of the cutting tool 100, the first side surface part 31 of the guide pad A1 is along the first wall part 106, and the second side surface part 32 comes into contact with the second wall part 107 after the guide pad A1 is inserted so as to reach near the fixation position.

At this point in time, a fixing force, i.e. a fastening force, has not been generated between the guide pad A1 and the guide pad housing part 105*a*, and the guide pad A1 can slide over the mounting surface 108 with a slight force.

Meanwhile, the first side surface part 31 and the second side surface part 32 each have a dovetail shape, as described above, and the cross-sectional shape of the guide pad housing part 105*a* has a dovetail groove shape, and the first side surface part 31 and the second side surface part 32 are engaged with the guide pad housing part 105*a*, so that the guide pad A1 will not disconnect in the radial direction of the cutting tool, i.e., the direction of the normal of the mounting surface 108.

Since the first wall part 106 and the second wall part 107 are designed, as described above, when the guide pad A1 is pushed toward the base end of the body 101, the first side surface part 31 and the second side surface part 32 act so as to press and stretch the first wall part 106 and the second wall part 107, and as a result, a fastening force is generated between the guide pad A1 and the guide pad housing part 105*a*. The frictional force generated by such fastening force firmly fixes the guide pad A1 to the cutting tool body 101.

Figure 9:
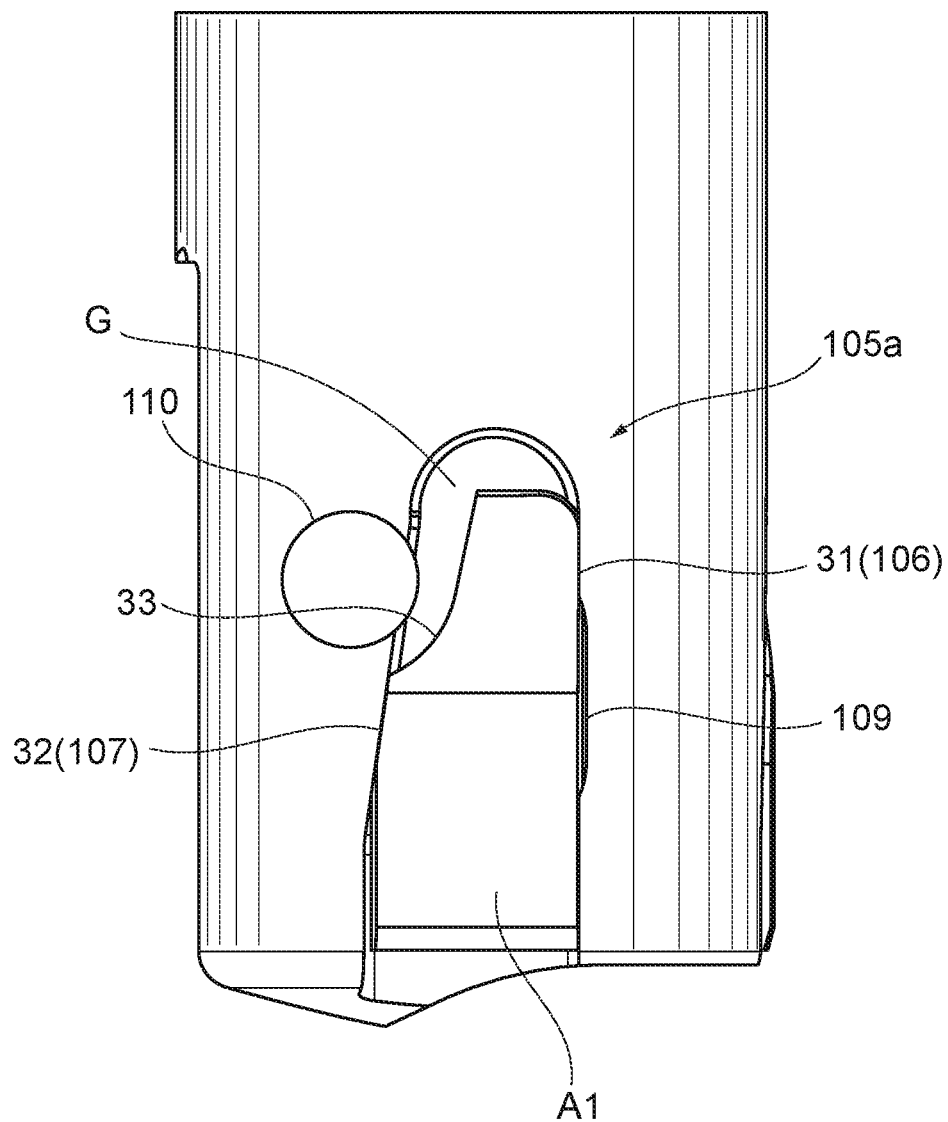
FIG. 9 is a view of the cutting tool body of FIG. 5, as viewed from a direction facing a guide pad.

It should be noted that, as is apparent from FIG. 9, a space G into which a tool enters is secured on the base end side of the guide pad housing part 105*a* of the fixed guide pad A1. The tool is inserted into this space G so as to apply a force directed toward the leading end to the fixed guide pad A1, whereby the guide pad A1 can be removed from the cutting tool body 101.

As described above, the guide pad A1 is removably mounted on the guide pad housing part 105*a* via a mechanical action (a fastening force and a frictional force), and thus, when the guide pad A1 is worn, it is possible to more reliably replace only the guide pad A1 without the need to replace the entire cutting tool body 101. Therefore, the cutting tool is more economical than a conventional cutting tool with brazed guide pads.

In the removing of the guide pad A1, it is not necessary to have fixation means, such as brazing or screws, separate from the guide pad A1, which is economical in terms of the machining cost and the number of components. Further, it is unnecessary to subject the guide pad A1 and the cutting tool body 101 to machining which reduces the strength, such as drilling, and thus, the strengths of both the guide pad A1 and the cutting tool body 101 will not be reduced. In particular, this is effective in tools for drilling small-diameter holes and rotating tools.

When fixing the guide pad A1, the cutting tool body 101 is not required to be heated for brazing so as to reach a high temperature, and this does not invite a situation in which heat softens and deforms the cutting tool body 101.

In the case of brazing, if a brazing material varies in thickness, a guide pad may be mounted while deviating or being inclined in an unintentional direction, but the guide pad A1 does not involve such cause of variation. Accordingly, the guide pad can be mounted at the same desired posture at a higher probability.

The fixation of the guide pad A1 does not require screws, and thus, a situation will not occur in which a threaded hole and a screw inserted therethrough neither communicate with an oil hole serving as a coolant flow path nor block the oil hole. Therefore, it is unnecessary to provide an oil hole so as to avoid the threaded hole, and this allows the oil hole to be freely arranged.

Further, the guide pad A1 is arranged such that the first side edge 11 and the first side surface part 31 are located backward in the tool rotating direction. Further, the first side surface part 31 comes into contact with the first wall part 106 which extends substantially parallel to the axis of the body 101. Therefore, when a force directed backward in the tool rotating direction is applied to the guide pad A1, the first wall part 106 receives such force more firmly while the engagement action between the first wall part 106 and the first side surface part 31 can hold the guide pad A1 more firmly.

The present invention has been described above, taking an embodiment of the invention as an example. However, the present invention is not limited to the above embodiment.

In the above embodiment, the cutting tool replacement member of the present invention is used as a guide pad for increasing the straightness of the tool, but the usage form of such cutting tool replacement member is not limited thereto. For example, the cutting tool replacement member of the present invention is mounted not only on the outer peripheral surface of the cutting tool body but also on a part where attrition is prone to occur, such as a location where intense abrasion occurs due to chips, whereby it is only required to replace a damaged cutting tool replacement member alone, thereby resulting in an extended life for the cutting tool body, i.e., the so-called tool life. In other words, the cutting tool replacement member of the present invention may be used for any purpose, as long as it involves a usage method based on the assumption that a replacement is performed every time wear or damage occurs.

In the above embodiment, the shape of the upper surface is a substantially pentagonal shape which is long in one direction, but the shape of the upper surface of the present invention is not limited thereto. The upper surface may have any shape, as long as it has a shape comprising a pair of side edges which forms a so-called tapered shape, in which the spacing between the side edges gradually becomes narrower. For example, it may be possible to employ a triangle and a quadrangle as well as a hexagon and polygons having more than six corners.

In the above embodiment, the reference side edge and the inclined side edge are both lines, but the present invention is not limited thereto. The reference side edge and the inclined side edge may each have any shape, as long as they form a so-called tapered shape in which the spacing between the two side edges gradually becomes narrower. For example, when seen from a top view, the reference side edge and the inclined side edge may each have a shape which is curved and bulges outward so as to serve as part of an ellipse. To put it another way, when fitting the cutting tool replacement member of the present invention into a guide pad housing part of a cutting tool body, the reference side edge and the inclined side edge are each only required to have a shape which generates a fastening force between right and left wall surfaces of the guide pad housing part and side surfaces of the cutting tool replacement member.

In the guide pad of the above embodiment, the upper surface has a convex shape when seen in a cross section perpendicular to a longer-side direction. However, when the present invention is used as a guide pad, the shape of the upper surface is not limited thereto. In other words, the upper surface is only required to be curved so as to sufficiently secure a contact area with the wall of a hole, and thus, the shape of the upper surface may be any shape, as long as, when observing cross sections perpendicular to the lower surface, it has at least one convex cross section which can be seen to be convex.

At this time, it is not required that all the convex cross sections have the same shape, and such convex cross sections may have different shapes. When the entire guide pad is viewed, the upper surface is only required to be convex rather than being flat, and any detailed form of curve may be employed. For example, as opposed to the above embodiment, the upper surface may have a shape which is convex when viewed in a cross section parallel to the longer-side direction of the upper surface. It should be noted, however, that, when using the present invention as a guide pad, the upper surface preferably has a shape which is convex when viewed in a cross section perpendicular to the longer-side direction.

In the above embodiment, the first side surface part, the second side surface part and the third surface part are each formed in a dovetail shape, and such side surface parts are overhanging outward from the guide pad. However, the present invention is not limited to such shape. That is, it is only required that either the first side surface part or the second side surface part includes an overhanging part which is overhanging outward so as to be engaged with the guide pad housing part.

Therefore, for example, it is also possible to employ an embodiment in which only a first side surface part is provided with a parallelepiped protruding part. Alternatively, it is also possible to employ an embodiment, as in the above embodiment, in which both side surface parts are each provided with a triangular rod-shaped protruding part having an inclined surface which is inclined outward from an upper surface toward a lower surface.

Figure 12:
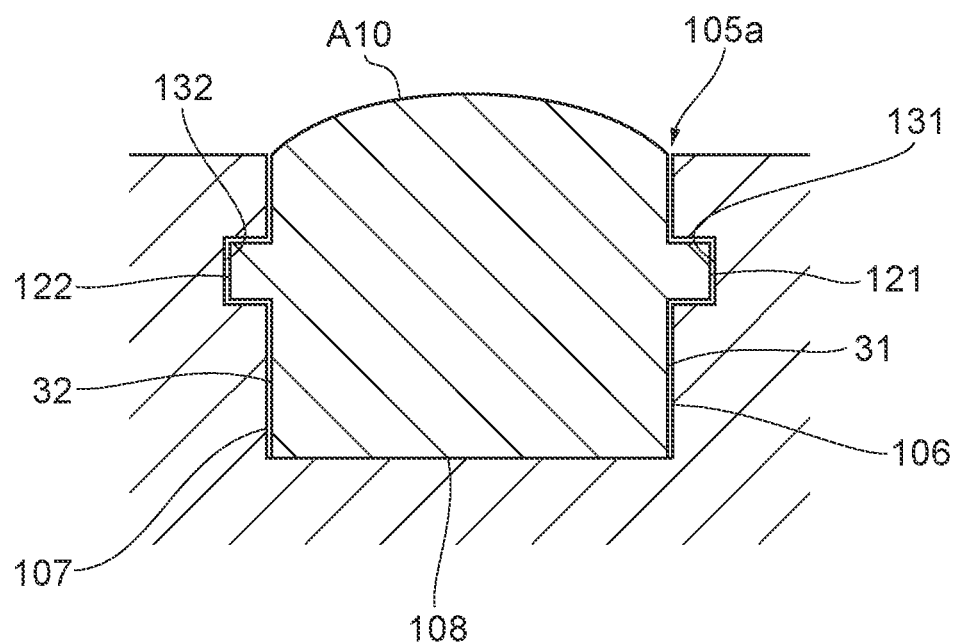
FIG. 12 is a cross-sectional view showing modifications of the guide pad and the guide pad housing part.

In the above embodiment, the cross-sectional shape of the guide pad housing part has a dovetail groove shape so as to be engaged with the first side surface part and the second side surface part of the guide pad, but, in the present invention, the cross-sectional shape is not limited to such shape. That is, it is only required that a fastening force is applied to the cutting tool replacement member and that the first wall part and the second wall part of the guide pad housing part are provided with portions (engagement parts) for preventing the guide pad from disconnecting in the tool radial direction. For example, the first wall part or/and the second wall part may be provided with a recessed part(s) for housing an overhanging portion(s) for the prevention of disconnecting, wherein such recessed part(s) is(are) formed in the first side surface part or/and the second side surface part. The related example is shown in FIG. 12. FIG. 12 shows: a guide pad A10 in which overhanging parts 121, 122 for the prevention of disconnecting are respectively formed in a first side surface part 31 and a second side surface part 32; and a guide pad housing part 105a in which recessed parts 131, 132 for respectively housing the overhanging parts 121, 122 of the guide pad A10 are respectively formed in a first wall part 106 and a second wall part 107.

Figure 13:
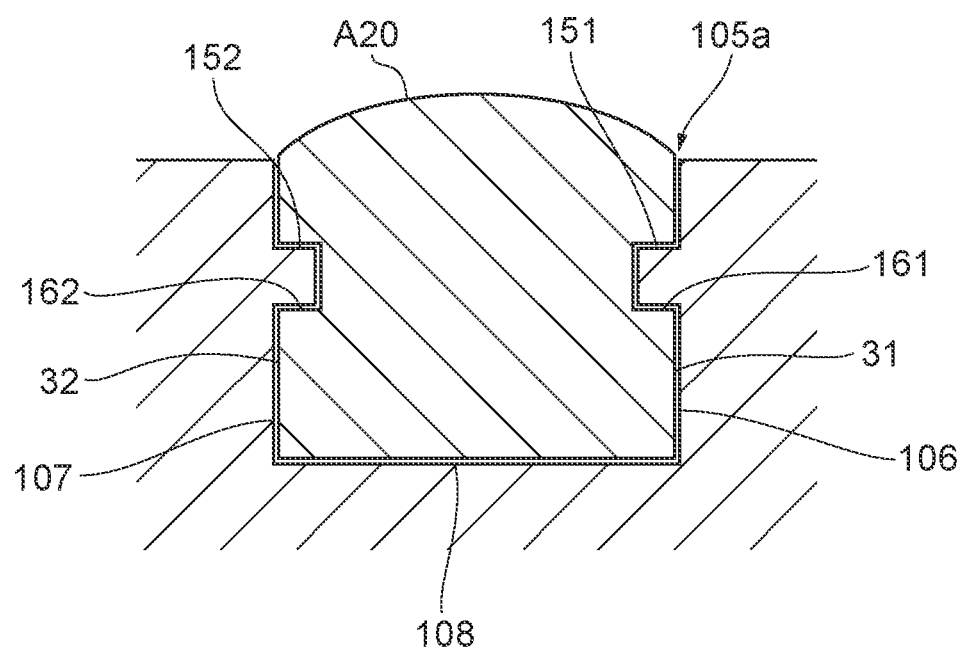
FIG. 13 is a cross-sectional view showing other modifications of the guide pad and the guide pad housing part.
Figure 14:
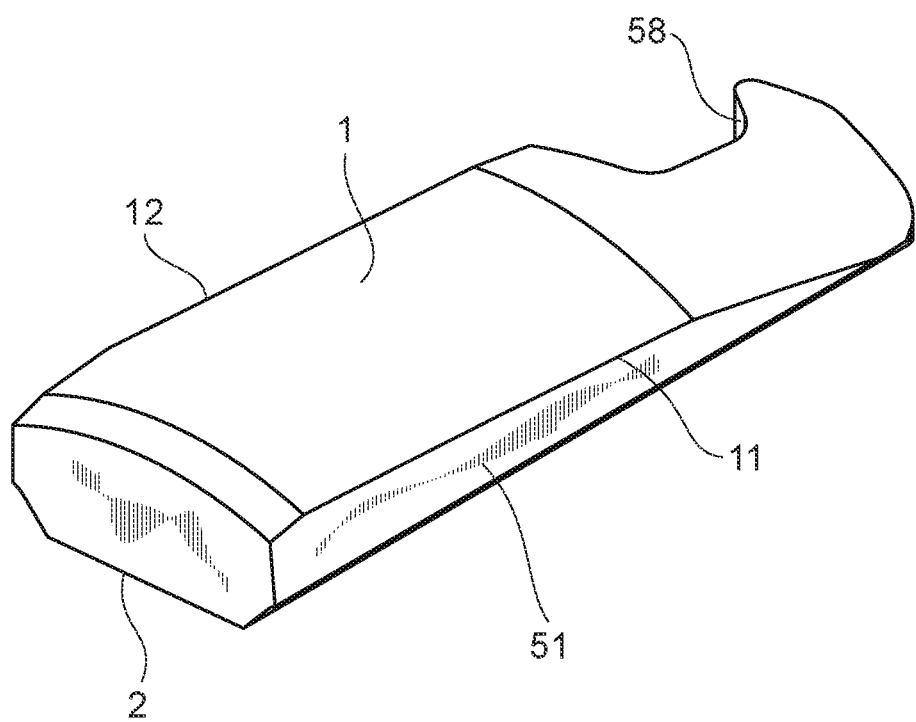
FIG. 14 is a perspective view of a guide pad according to another embodiment of the present invention.
Figure 15:
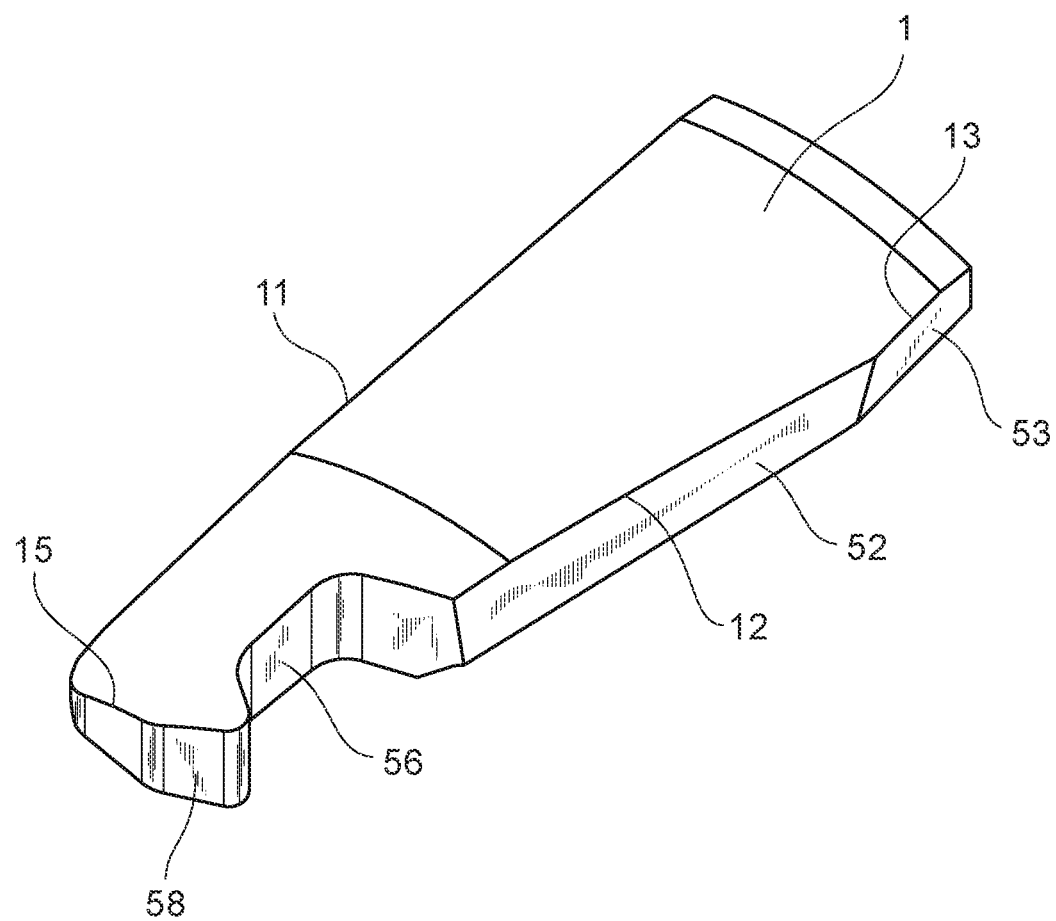
FIG. 15 is a perspective view of the guide pad of FIG. 14, as viewed from another angle.

Further, the first side surface part or/and the second side surface part may be provided with an indented part(s), and a protruding part(s) (an overhanging part(s)) to be received in such indented part(s) may be formed in the first wall part or/and the second wall part. The related example is shown in FIG. 13. FIG. 13 shows: a guide pad housing part 105a in which protruding parts 151, 152 for the prevention of disconnecting are respectively formed in a first wall part 106 and a second wall part 107; and a guide pad A20 in which indented parts 161, 162 for respectively housing the protruding parts 151, 152 of the guide pad housing part 105a are respectively formed in a first side surface part 31 and a second side surface part 32.

As described above, the cutting tool replacement member of the present invention is not limited to the form of the guide pad A and may instead take various forms.

Figure 19:
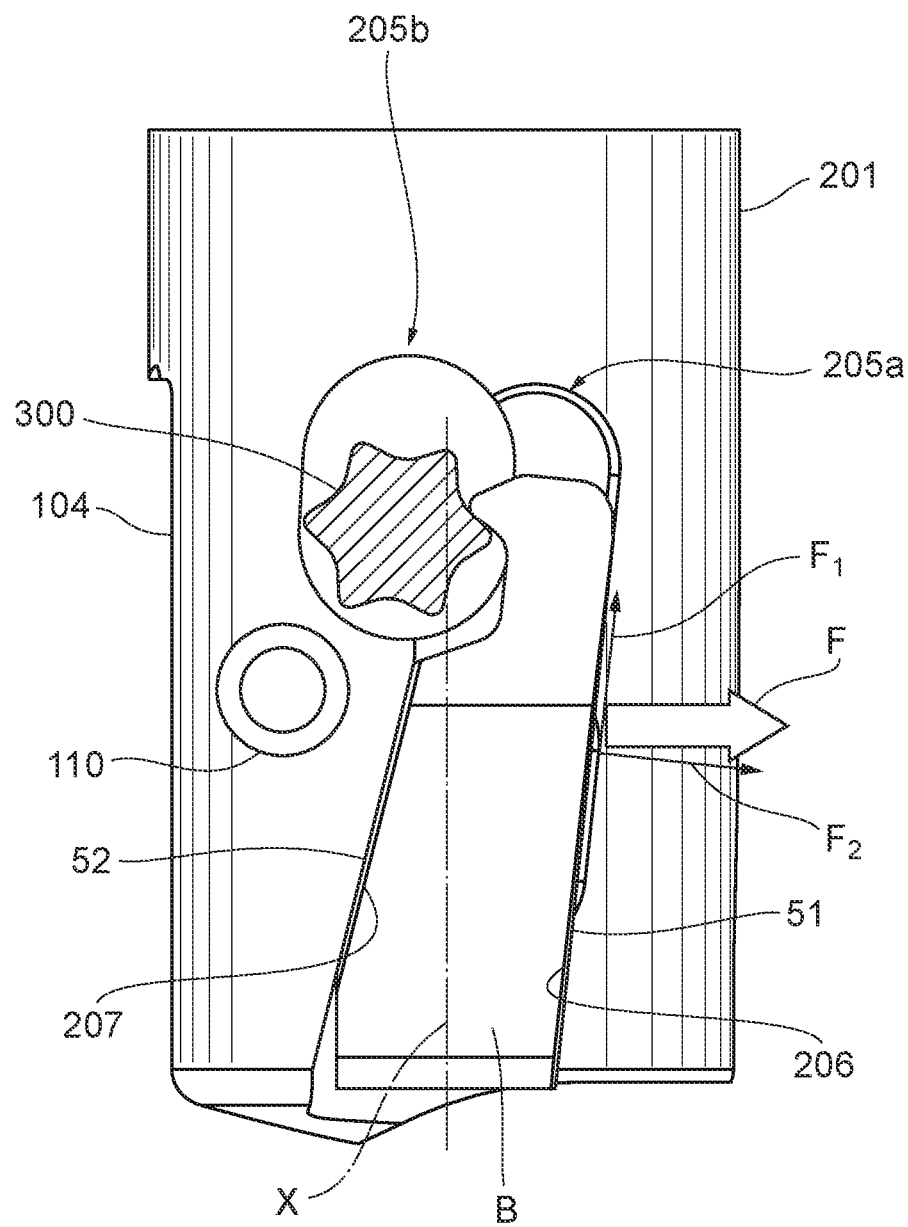
FIG. 19 is a view of a state in which the guide pad of FIG. 14 is mounted on the cutting tool body by means of a wrench, as viewed from a direction facing the guide pad.
Figure 20:
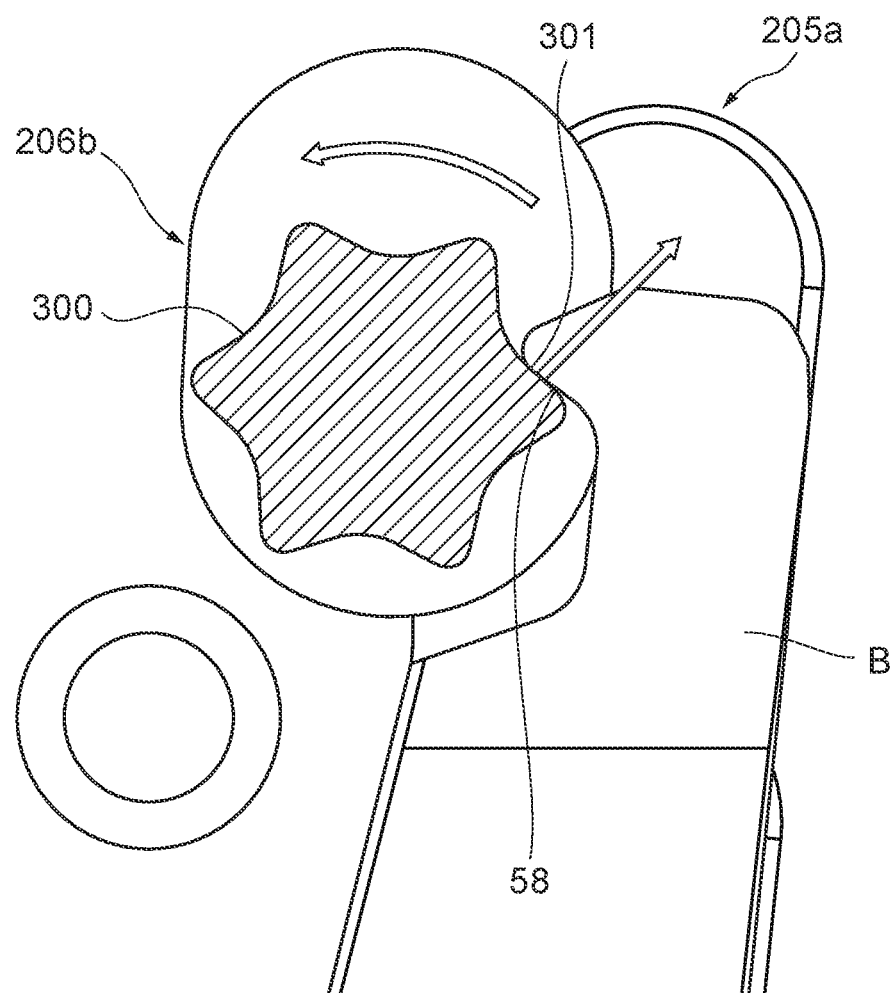
FIG. 20 is a partially enlarged view of FIG. 19.
Figure 21:
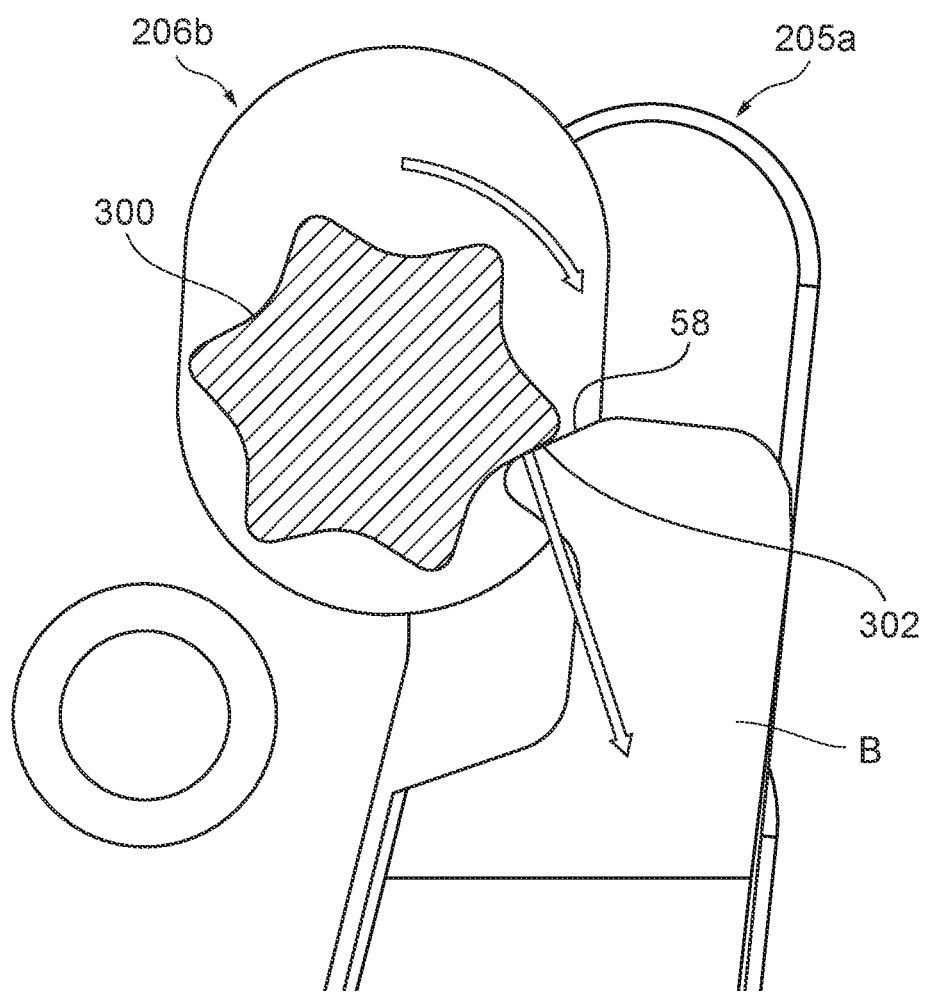
FIG. 21 is a partially enlarged view of a state in which the guide pad of FIG. 14 is demounted from the cutting tool body by means of a wrench, as viewed from the direction facing the guide pad.

FIGS. 14 to 18 each show a guide pad B serving as a form different from that of the guide pad A. FIGS. 19 to 21 each illustrate the operation effected when mounting the guide pad B on a cutting tool body or demounting the guide pad B from the cutting tool body, with the use of a wrench having a hexagonal star shaped leading end (a so-called Torx wrench ("Torx" is a registered trademark)). FIGS. 22 to 25 each illustrate the operation effected when mounting the guide pad B on the cutting tool body or demounting the guide pad B from the cutting tool body, with the use of a wrench different from that shown in FIG. 19.

In the description below, the members or portions having the same structures or functions as those of the guide pad A and the cutting tool body 101 shown in FIGS. 1 to 11 are denoted by the same symbols as those of FIGS. 1 to 11, and the description thereof may be simplified or omitted here. Further, in FIGS. 14 to 25, the symbols attached to such members or portions may be omitted.

Major structural differences between the guide pad B and the guide pad A will be described below. Firstly, in the guide pad A, a convex center line of the upper surface 1 which forms a convex shape and the first side surface part 31 serving as a major restraining surface are parallel to each other, whereas, in the guide pad B, a convex center line of an upper surface 1 having a convex shape and a first side surface part 31 serving as a major restraining surface are not parallel to each other. Secondly, the guide pad B comprises, on one end (leading end) side in the longer-side direction, a tool engagement part which is capable of being engaged with a wrench. Description will be made below centering on the above differences.

Figure 16:
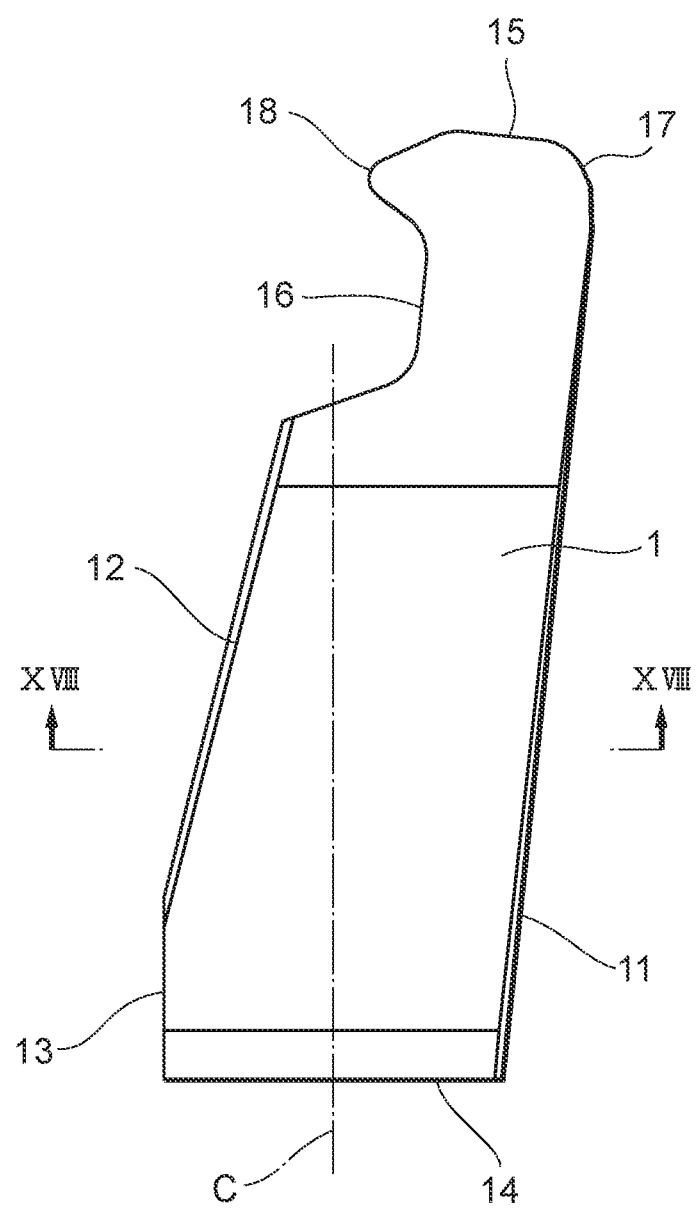
FIG. 16 is a front view of the guide pad of FIG. 14.
Figure 17:
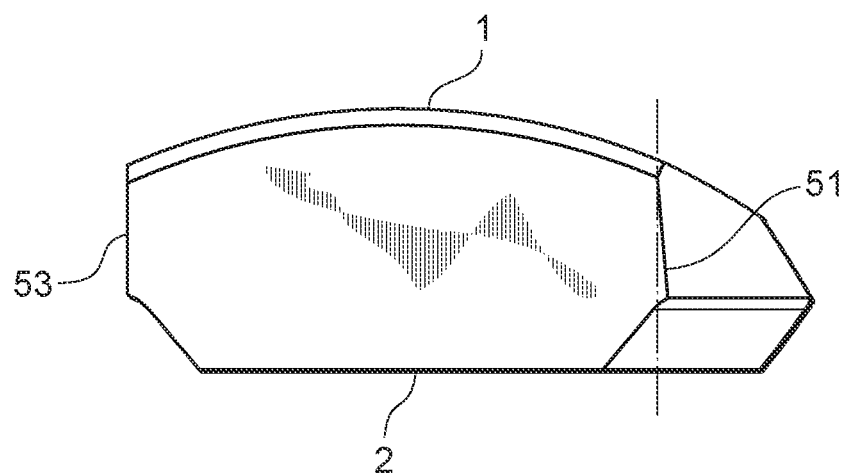
FIG. 17 is a bottom view of the guide pad of FIG. 14.
Figure 18:
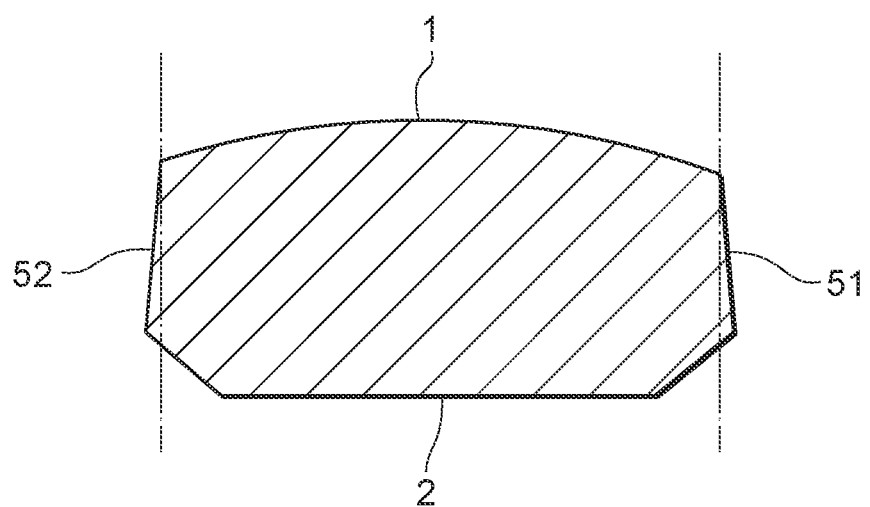
FIG. 18 is a cross-sectional view taken along a XVIII-XVIII line of FIG. 16.

As is apparent from the front view of FIG. 16 (a top view, i.e., a view in which the guide pad B is viewed from a side facing the upper surface 1), an intersection between the upper surface 1 and a side surface 3, i.e., a side edge therebetween, includes: a first side edge 11 which is inclined relative to a center line C and is the longest side edge; a second side edge 12 which is located so as to be opposed to the first side edge 11 and is inclined relative to the center line C; a third side edge 13 which is substantially parallel to the center line C and is connected to the second side edge 12; and a fourth side edge 14 and a fifth side edge 15 which perpendicularly extend to the third side edge 13 and are substantially parallel to each other. The center line C is the convex center line of the upper surface 1 which forms a convex shape, and in FIG. 16, such center line can be defined as a line which passes through a mid-point of the fourth side edge 14 and is orthogonal to the fourth side edge 14.

The upper surface 1 includes, in addition to the first through fifth side edges 11 to 15, a sixth side edge 16 in a concave shape, a seventh side edge 17 in a convex shape, and an eighth side edge 18 in a convex shape. The sixth side edge 16 leads to the second side edge 12. The eighth side edge 18 is located between the sixth side edge 16 and the fifth side edge 15, and the seventh side edge 17 is located between the first side edge 11 and the fifth side edge 15. The side surface 3 comprises eight side surface parts corresponding to the first through eighth side edges 11 to 18. The eight side surface parts are each connected to the upper surface 1 and a lower surface 2 and are placed in a substantially consecutive manner in a circumferential direction. It should be noted that the first through eighth side edges 11 to 18 are connected, respectively, to the corresponding side surface parts, i.e., first through eighth side surface parts 51 to 58.

As described above, the upper surface 1 comprises the third side edge 13 which is parallel to the center line C, the second side edge 12 which is inclined relative to the center line C and leads to the third side edge 13, and the first side edge 11 which is inclined relative to the center line C and leads to the fourth side edge 14. Further, in FIG. 16, an inclination angle of the second side edge 12 with respect to the center line C is greater than an inclination angle of the first side edge 11 with respect to the center line C. Thus, the spacing between the first side edge 11 and the second side edge 12 gradually becomes narrower, heading away from the fourth side edge 14 toward the fifth side edge 15. It should be noted that the first side edge 11 may be parallel to the center line C, as in the guide pad A, and in such case, the first side surface part 51 is also parallel to the center line C.

As shown in FIGS. 14 to 18, in the side surface of the guide pad B, the first side surface part 51 connected to the first side edge 11 of the upper surface 1 and the second side surface part 52 connected to the second side edge 12 thereof are each inclined outward, heading away from the upper surface 1 toward the lower surface 2. That is, the first side surface part 51 and the second side surface part 52 each have a so-called dovetail shape. The portions overhanging outward from the first side surface part 51 and the second side surface part 52 when seen from a top view prevent the guide pad B from disconnecting in a radial direction of the body 201 when the guide pad B is mounted on a cutting tool body 201 shown in FIG. 19. Meanwhile, the side surface part 53 connected to the third side edge 13 does not have a dovetail shape and serves as a surface perpendicular to the lower surface 2.

The eighth side surface part 58 in a convex shape which is connected to the eighth side edge 18 of the upper surface 1 defines a tool engagement part which is capable of being engaged with a wrench used when mounting/demounting the guide pad B on/from the tool body 201, and a surface of the tool engagement part serves as a contact surface which comes into contact with the wrench. Regarding this tool engagement part, at one end thereof on the fifth side edge 15 side in the top view of the sixth side surface part 56 from among the side surface parts which leads to the second side surface part 52, i.e., in the present embodiment, on the fifth side edge 15 side of the guide pad B, such tool engagement part protrudes from such one end in a direction intersecting with the first side surface part 51. It should be noted that the eighth side surface part 58 protruding in the direction intersecting with the first side surface part 51 means that the eighth side surface part 58 protrudes further in the direction intersecting with the first side surface part 51 than the sixth side surface part 56, being a portion adjacent to the eighth side surface part 58, and the fifth side surface part 55 connected to the fifth side edge 15. The eighth side surface part 58 which extends along the eighth side edge 18 in a convex shape and the sixth side surface part 56 which extends along the sixth side edge 16 in a concave shape are formed further inward of the guide pad B than an extension plane of the second side surface part 52.

Next, a cutting tool body according to another embodiment of the present invention will be described. This cutting tool body is suited for the use of the guide pad B. FIGS. 19 to 21 each show a view of a leading end (a leading-end-side main part) of the cutting tool body 201 of the present embodiment or an enlarged view thereof.

An outer peripheral surface of the cutting tool body 201 is provided with a guide pad housing part 205a for mounting the guide pad A and a wrench receiving part 205b for receiving the insertion of a wrench used for the mounting and demounting of the guide pad B. A threaded hole 110 of an insert mounting part 104 which is opened in the outer peripheral surface of the body 201 is located apart from the guide pad housing part 205a and the wrench receiving part 205b. It should be noted that, although not shown in FIG. 19, the outer peripheral surface of the body 201 is provided with a guide pad housing part and a wrench receiving part respectively having the same shapes as those of the guide pad housing part 205a and the wrench receiving part 205b.

The guide pad housing part 205a is opened in a leading end surface of the body 201 and is also opened in the outer peripheral surface of the body 201. The guide pad housing part 205a comprises a mounting surface on which the lower surface 2 of the guide pad B is mounted and a first wall part (standing wall) 206 and a second wall part (standing wall) 207 which are formed on both sides of such mounting surface. The first wall part 206 and the second wall part 207 are formed so as to extend while being inclined relative to an axis X of the body 201.

The first wall part 206 and the second wall part 207 are configured such that the first wall part 206 comes into contact with the first side surface part 51 of the guide pad B and such that the second wall part 207 comes into contact with the second side surface part 52 of the guide pad B. The first wall part 206 and the second wall part 207 are not perpendicular to the mounting surface of the guide pad housing part 205a and are instead inclined inward to some degree (i.e., so as to overhang above the mounting surface as they head away from the mounting surface). That is, an angle formed by the mounting surface and the second wall part 206 and an angle formed by the mounting surface and the second wall part 207 each form an acute angle. To put it another way, a space which is defined by the first wall part 206, the second wall part 207 and the mounting surface forms a so-called dovetail groove shape (dovetail shape).

As viewed from a direction facing the mounting surface (i.e., in FIG. 19), an edge at an upper end of the second wall part 207 (an intersection between the second wall part 207 and the outer peripheral surface of the body 201) and an edge at an upper end of the first wall part 206 (an intersection between the first wall part 206 and the outer peripheral surface of the body 201) are inclined relative to the axis X of the body 201. Therefore, the spacing between the two edges becomes narrower, heading toward a base end of the cutting tool body 201. More specifically, the degree of narrowing of the spacing between the edge at the upper end of the first wall part 206 and the edge at the upper end of the second wall part 207 is smaller than the degree of narrowing of the spacing between the first side edge 11 and the second side edge 12 in the top view of the guide pad B of FIG. 16. In other words, an angle formed by the edge of the first wall part 206 and the edge of the second wall part 207 is slightly smaller than an angle formed by the first side edge 11 and the second side edge 12 in the top view of the guide pad B. With such shape, a fastening force is generated between the guide pad housing part 205a and the guide pad B by pushing the guide pad B into the guide pad housing part 205a from the leading end side of the body 201 in the direction of the axis, and the frictional force generated by such fastening force fixes the guide pad B in the direction of the rotational axis of the body 201.

The wrench receiving part 205b is opened in the outer peripheral surface of the body 201. More specifically, the wrench receiving part 205b is a recessed part having a long hole shape in a top view which is formed on the base end side of the guide pad housing part 205a so as to lead to a front part of the guide pad housing part 205a in a tool rotating direction. In other words, the wrench receiving part 205b is arranged on an extension of the second wall part 207 of the guide pad housing part 205a. The top view shape of the wrench receiving part 205b is not limited to a long hole and may be comprised of an ellipse, a circle, a quadrangle or a potbellied shape (a shape obtained by overlapping respective parts of two circles having the same diameter or different diameters).

When the guide pad B is mounted on the guide pad housing part 205a formed as described above, the guide pad B is inserted, through an entry port of the guide pad housing part 205a (an opening of the guide pad housing part 205a which is opened in the leading end surface of the body 201), so as to slide over the mounting surface. As a result, the first side surface part 51 and the second side surface part 52 of the guide pad B are pushed, toward the mounting surface, respectively by the first wall part 206 and the second wall part 207, and the guide pad B is less likely to be disconnected, i.e., firmly held, in a direction of a normal of the mounting surface, i.e., a radial direction of the cutting tool body 201.

As shown in FIG. 19, in the present embodiment, the wrench receiving part 205b is formed closer to a base end of the guide pad housing part 205a and forward in the tool rotating direction, whereby a space which contains a wrench 300 having a hexagonal star shaped leading end can be secured. Thus, the guide pad B is inserted into the guide pad housing part 205a from the leading end side of the cutting tool body 201, the guide pad B is pushed toward the base end of the body 201 to a certain point, and then, as shown in FIG. 20, the wrench 300 is inserted into the wrench receiving part 205b and rotated counterclockwise around the axis, whereby, in an outer circumferential surface of the wrench 300, an outer circumferential surface 301 directed forward in a wrench rotating direction comes into contact with the eighth side surface part 58 of the guide pad B and then presses the eighth side surface part 58, and the guide pad B is pushed toward the base end of the guide pad housing part 205a. The first side surface part 51 and the second side surface part 52 then act so as to press and stretch the first wall part 206 and the second wall part 207 and, as a result, a fastening force is generated between the guide pad B and the guide pad housing part 205a. The frictional force generated by such fastening force firmly fixes the guide pad B to the cutting tool body 201.

When demounting the guide pad B from the body 201, as shown in FIG. 20, the wrench 300 is inserted into the wrench receiving part 205b and rotated clockwise, whereby, in the outer circumferential surface of the wrench 300, an outer circumferential surface 302 directed forward in the wrench rotating direction comes into contact with the eighth side surface part 58 of the guide pad B and then presses the eighth side surface part 58, and the guide pad B is pushed toward the leading end of the guide pad housing part 205a. Thus, the first side surface part 51 and the second side surface part 52 move toward the tool leading end along the first wall part 206 and the second wall part 207, so that the guide pad B can be easily demounted from the cutting tool body 201.

As described above, the guide pad B of the present embodiment comprises the protruding tool engagement part defined by the eighth side surface part 58 in a convex shape, and a mounting and demounting tool for mounting and demounting the guide pad B can be hung on the tool engagement part, whereby the mounting and demounting of the guide pad B can be easily performed with respect to the guide pad housing part 205a, using the general-purpose wrench 300 rather than a special-purpose tool. Further, the guide pad B can be more firmly drawn toward the base end of the guide pad housing part 205a. In other words, the first side surface part 51 of the guide pad B and the first wall part 206 which comes into contact with the first side surface part 51 are not parallel but are inclined relative to the axis X of the body 201. Thus, from among components of force F1, F2 which are obtained by decomposing, in two directions perpendicular to each other, a pressing force F exerted by the first side surface part 51 against the first wall part 206, the component of force F along the first wall part 206 serves as a force which draws the guide pad B toward the base end of the guide pad housing part 205a, and therefore, the guide pad B is more firmly drawn toward the base end of the guide pad housing part 205 than the guide pad A.

Figure 22:
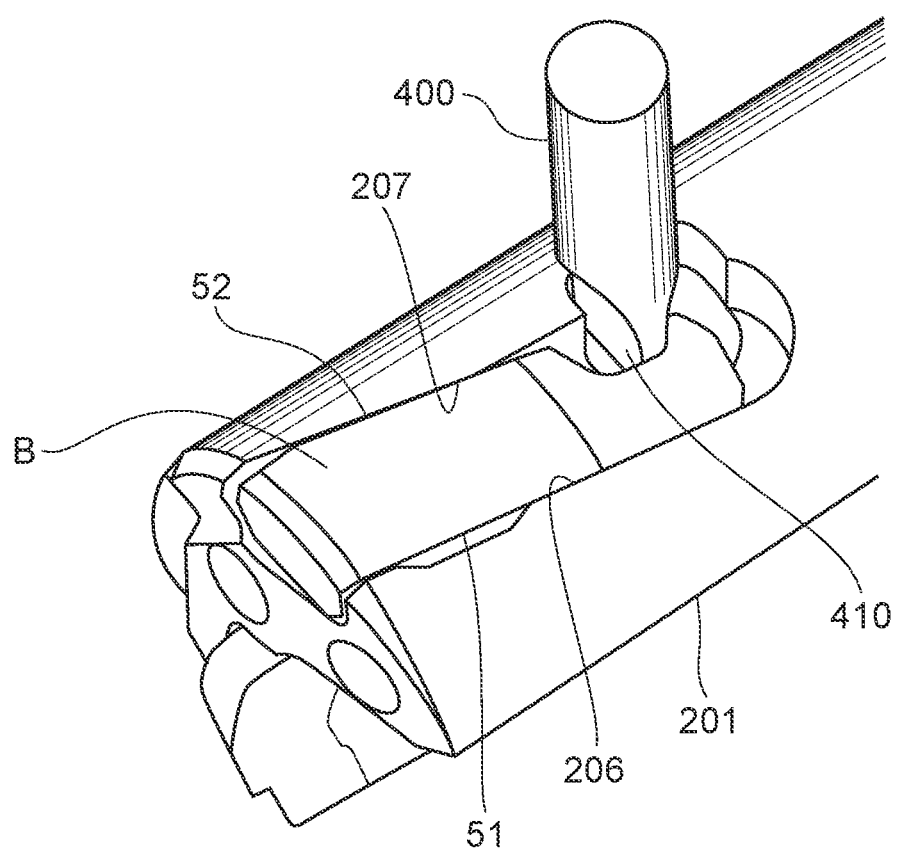
FIG. 22 is a perspective view of a state in which the guide pad of FIG. 14 is mounted on the cutting tool body by means of a wrench different from that used in FIG. 19, as viewed from a predetermined angle.

The guide pad B is a cutting tool replacement member suited also for a wrench in a different form from that of the wrench 300 shown in FIG. 19. For example, as shown in FIG. 22, the guide pad B provides the same operation and effects as with the case of using the above-described wrench 300, on a wrench 400 which includes a leading end 410 having a shape whose cross-sectional area decreases toward the leading end and regarding which the cross-sectional area becomes similar to a rectangle.

Figure 23:
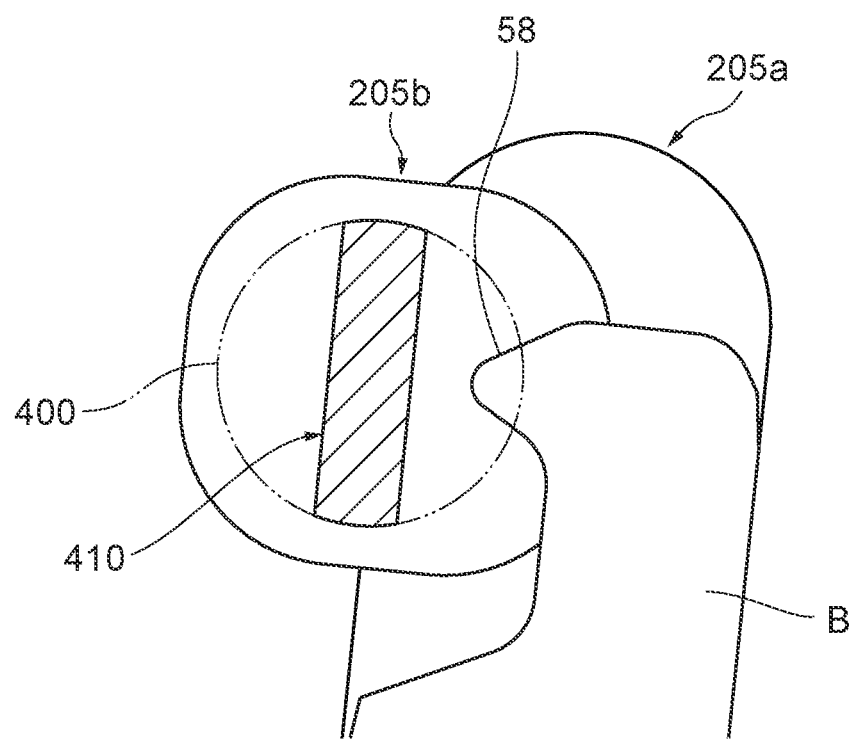
FIG. 23 is a view showing a state in which the wrench of FIG. 22 is in a neutral position.

FIG. 23 is a view showing a state in which, after the guide pad B is inserted into the guide pad housing part 205a, the wrench 400 is inserted into the wrench receiving part 205b. The state shown in the above figure is a state in which the leading end 410 of the wrench 400 does not come into contact with any portion of the eighth side surface part 58 of the guide pad B, and such state will hereinafter be referred to as a neutral state.

Figure 24:
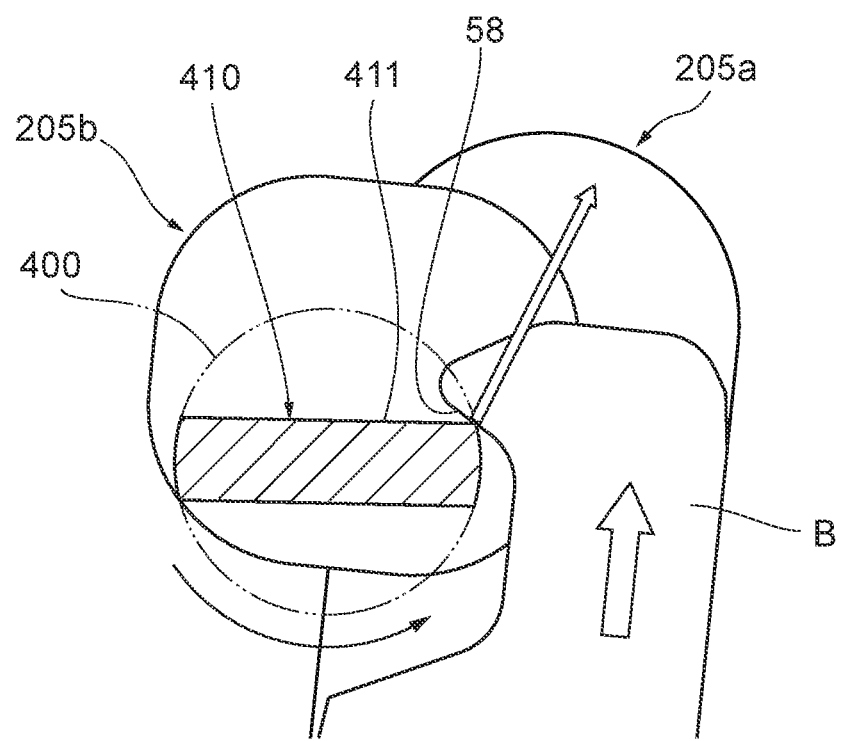
FIG. 24 is a partially enlarged view showing a state in which, when mounting the guide pad of FIG. 14 on the cutting tool body, the wrench of FIG. 22 is attempted to be rotated counterclockwise, as viewed from a direction facing the guide pad.

As shown in FIG. 24, the wrench 400 is rotated, from the neutral state of FIG. 23, counterclockwise around an axis thereof, whereby, regarding outer circumferential surfaces 411, 412 for long sides of the leading end 410 of the wrench 400, the portion on the side of the outer circumferential surface 411 which is directed forward in the wrench rotating direction comes into contact with the eighth side surface part 58 of the guide pad B and then presses the eighth side surface part 58, and the guide pad B is then pushed toward the base end of the guide pad housing part 205a.

Figure 25:
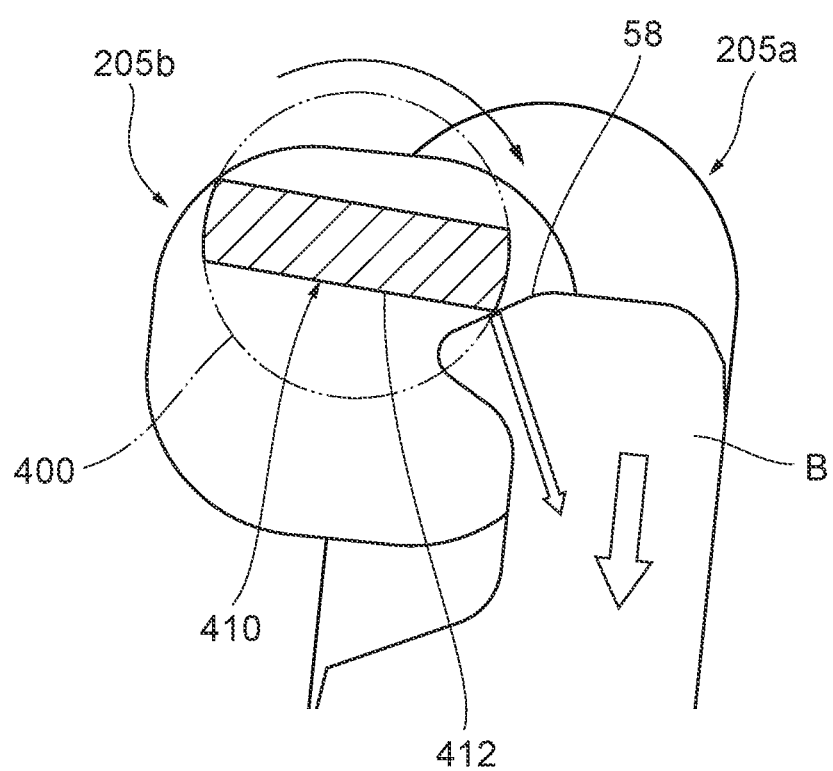
FIG. 25 is a partially enlarged view showing a state in which, when demounting the guide pad of FIG. 14 from the cutting tool body, the wrench of FIG. 22 is attempted to be rotated clockwise, as viewed from the direction facing the guide pad.

When demounting the guide pad B from the body 201, as shown in FIG. 25, the wrench 400 is rotated clockwise from the neutral state of FIG. 23, whereby, regarding the outer circumferential surfaces 411, 412 for the long sides of the leading end 410 of the wrench 400, the portion on the side of the outer circumferential surface 412 which is directed forward in the wrench rotating direction comes into contact with the eighth side surface part 58 of the guide pad B and then presses the eighth side surface part 58, and the guide pad B is then pushed toward the leading end of the guide pad housing part 205a of the guide pad B.

As described above, the guide pad B comprises the eighth side surface part 58 in a convex shape which is easily engaged with the tool for the mounting and demounting of the guide pad B, and the mounting and demounting of the guide pad B can therefore easily be performed with respect to the guide pad housing part 205a using a general-purpose tool such as the wrench 300 or the wrench 400 rather than a special-purpose tool.

REFERENCE SIGNS LIST

A, A1, A2, A10, A20 Guide pad
B Guide pad
1 Upper surface
2 Lower surface
3 Side surface
11 First side edge (reference side edge)
12 Second side edge (inclined side edge)
31 First side surface part
32 Second side surface part
33 Third side surface part
51 First side surface part
52 Second side surface part
58 Eighth side surface part
101 Cutting tool body
104 Insert mounting part
105a, 105b Guide pad housing part
106 First wall part
107 Second wall part
108 Mounting surface
109 Flank part
151, 152 Protruding part (overhanging part)
161, 162 Indented part
201 Cutting tool body
205a Guide pad housing part
205b Wrench receiving part
206 First wall part
207 Second wall part

What is claimed is:
1. A cutting tool body comprising:
a cutting tool replacement member comprising:
a lower surface which serves as a seating surface;

an upper surface which is opposed to the lower surface; and a side surface which is connected to the upper surface and the lower surface, wherein:

when seen from a top view, the upper surface comprises, in an intersection between the upper surface and the side surface, a reference side edge and an inclined side edge which is inclined relative to the reference side edge;

the side surface includes a first side surface part which is connected to the reference side edge of the upper surface, and a second side surface part which is connected to the inclined side edge of the upper surface; and at least one of the first side surface part and the second side surface part is provided with an overhanging part which is, when seen from a top view, protruding outward with respect to the reference side edge or the inclined side edge; and a housing part for mounting the cutting tool replacement member, wherein:

the housing part comprises, a mounting surface which is configured such that the lower surface of the cutting tool replacement member is slidable, a first wall part which extends so as to rise from the mounting surface and with which the first side surface part of the cutting tool replacement member is capable of coming into contact, a second wall part which extends so as to rise from the mounting surface and with which the second side surface part of the cutting tool replacement member is capable of coming into contact, and an opening which is partially defined by the mounting surface, the first wall part and the second wall part, and wherein:

a spacing between the first wall part and the second wall part gradually becomes narrower, heading away from the opening as viewed from a direction facing the mounting surface such that a fastening force is exerted on the cutting tool replacement member; and at least one of the first wall part and the second wall part includes an engagement part which is engaged with the overhanging part of at least one of the first side surface part and the second side surface part of the cutting tool replacement member.

2. The cutting tool body according to claim 1, wherein the upper surface is convex in a cross section substantially perpendicular to the lower surface.

3. The cutting tool body according to claim 1, wherein the second side surface part or a side surface part which leads thereto comprises a tool engagement part which protrudes further outward than a portion adjacent to the tool engagement part in a direction intersecting with the first side surface part or an extension plane thereof.

4. The cutting tool body according to claim 3, wherein:

when seen from a top view, the upper surface comprises, in the intersection between the upper surface and the side surface, a side edge in a concave shape which is connected to an end of the inclined side edge and a side edge in a convex shape which is connected to an end of the side edge in a concave shape;

the side surface includes a concave side surface part which is connected to the side edge in a concave shape of the upper surface, and a convex side surface part which is connected to the side edge in a convex shape of the upper surface; and the convex side surface part defines the tool engagement part.

5. The cutting tool body according to claim 1, wherein:

the overhanging part of the cutting tool replacement member includes an inclined surface that is inclined outwardly when heading from the upper surface toward the lower surface; and when mounting the cutting tool replacement member, the engagement part includes an inclined contact surface which comes into contact with the inclined surface of the overhanging part.

6. The cutting tool body according to claim 1, wherein:

the first wall part is provided with a flank part for dividing a contact portion with the first side surface part into two areas; and when seen from a top view, a contact portion between the second wall part and the second side surface part is included in a virtual area defined by two virtual planes which respectively pass through two ends of the flank part.

7. The cutting tool body according to claim 1, wherein a receiving part which receives an insertion of a mounting and demounting tool used when mounting or demounting the cutting tool replacement member is provided, in a top view, on a side opposite to the opening of the receiving part and forward in a tool rotating direction.

8. The cutting tool body according to claim 7, wherein the receiving part is arranged on an extension of the second wall part.

9. A cutting tool body comprising:

a cutting tool replacement member comprising:

a lower surface which serves as a seating surface;

an upper surface which is opposed to the lower surface; and a side surface which is connected to the upper surface and the lower surface, wherein:

when seen from a top view, the upper surface comprises, in an intersection between the upper surface and the side surface, a reference side edge and an inclined side edge which is inclined relative to the reference side edge;

the side surface includes a first side surface part which is connected to the reference side edge of the upper surface, and a second side surface part which is connected to the inclined side edge of the upper surface; and the first side surface part or the second side surface part is provided with an indented part which is recessed inward; and a housing part for mounting the cutting tool replacement member, wherein:

the housing part comprises, a mounting surface which is configured such that the lower surface of the cutting tool replacement member is slidable, a first wall part which extends so as to rise from the mounting surface and with which the first side surface part of the cutting tool replacement member is capable of coming into contact, a second wall part which extends so as to rise from the mounting surface and with which the second side surface part of the cutting tool replacement member is capable of coming into contact, and an opening which is partially defined by the mounting surface, the first wall part and the second wall part, and wherein:

a spacing between the first wall part and the second wall part gradually becomes narrower, heading away from the opening as viewed from a direction facing the mounting surface; and the first wall part or the second wall part includes a protruding part which is received in an inner wall surface of the indented part formed in the first side surface part or the second side surface part.

10. A cutting tool replacement member comprising:

a lower surface which serves as a seating surface;

an upper surface which is opposed to the lower surface; and a side surface which is connected to the upper surface and the lower surface, wherein:

when seen from a top view, the upper surface comprises, in an intersection between the upper surface and the side surface, a reference side edge and an inclined side edge which is inclined relative to the reference side edge;

the side surface includes a first side surface part which is connected to the reference side edge of the upper surface, and a second side surface part which is connected to the inclined side edge of the upper surface;

at least one of the first side surface part and the second side surface part is provided with an overhanging part which is, when seen from a top view, protruding outward with respect to the reference side edge or the inclined side edge;

a convex center line of the upper surface having a convex shape and the first side surface part serving as a major restraining surface are not parallel to each other; and the upper surface includes a top side edge positioned on one end side of replacement member and a bottom side edge positioned on a side of replacement member opposite to the top side edge as viewed in the top view, and the first side surface part extends along a plane inclined away from the convex center line when going in a direction from the bottom side edge toward the top side edge.

11. The cutting tool replacement member of claim 10, wherein the first side surface part is straight along its entire length.

* * * * *